US012069172B2

(12) United States Patent
Jing et al.

(10) Patent No.: US 12,069,172 B2
(45) Date of Patent: Aug. 20, 2024

(54) GROUP SERVICE IMPLEMENTATION METHOD AND DEVICE, EQUIPMENT AND STORAGE MEDIUM

(71) Applicant: BEIJING BAIDU NETCOM SCIENCE TECHNOLOGY CO., LTD., Beijing (CN)

(72) Inventors: Bo Jing, Beijing (CN); Peiqian Zhang, Beijing (CN); Hongyan Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 483 days.

(21) Appl. No.: 17/452,496

(22) Filed: Oct. 27, 2021

(65) Prior Publication Data
US 2022/0045849 A1 Feb. 10, 2022

(30) Foreign Application Priority Data

Dec. 29, 2020 (CN) .......................... 202011593351.X

(51) Int. Cl.
*H04L 9/36* (2006.01)
*H04L 9/08* (2006.01)
(Continued)

(52) U.S. Cl.
CPC ............ *H04L 9/088* (2013.01); *H04L 9/3247* (2013.01)

(58) Field of Classification Search
CPC ... H04L 2209/46; H04L 9/088; H04L 9/3239; H04L 9/3247; H04L 9/3255; H04L 9/50
See application file for complete search history.

(56) References Cited

U.S. PATENT DOCUMENTS 10,380,685 B1 * 8/2019 Phillips .................. G06Q 40/03
10,771,384 B2 * 9/2020 Trautmann .............. H04L 69/22
(Continued)

FOREIGN PATENT DOCUMENTS

CN 110084600 A 8/2019
CN 111541551 A 8/2020
(Continued)

OTHER PUBLICATIONS

Notice of Reasons for Refusal, Japanese Patent Office, issued to Japanese Patent Application No. 2021-199474 on Jan. 4, 2023, 4 pages.
(Continued)

*Primary Examiner* — Gary S Gracia
(74) *Attorney, Agent, or Firm* — Hunton Andrews Kurth LLP

(57) ABSTRACT

Provided are a group service implementation method and device, an equipment and a storage medium. The specific solution is described below. A service transaction request is acquired. In response to the service transaction request including to-be-authenticated data and a threshold signature, a signature group corresponding to the threshold signature is determined. Group information of the signature group is acquired by querying a blockchain, where the signature group includes at least two members, the at least two members of the signature group are used for authenticating the to-be-authenticated data by adopting secure multi-party computation and generating the threshold signature for the to-be-authenticated data by adopting a signature private key, and the group information includes at least a verification public key of the threshold signature. The threshold signature is verified by adopting the verification public key in the group information.

18 Claims, 9 Drawing Sheets

(51) Int. Cl.
  *H04L 9/32* (2006.01)
  *H04L 9/38* (2006.01)

(56) References Cited

U.S. PATENT DOCUMENTS

| | | | |
|---|---|---|---|
| 11,451,406 B2* | 9/2022 | Chen | H04L 9/3066 |
| 11,734,455 B2* | 8/2023 | Jing | G06F 21/64 |
| | | | 726/26 |
| 11,755,562 B2* | 9/2023 | Kofman | G06F 16/2365 |
| | | | 707/690 |
| 11,902,456 B2* | 2/2024 | Zamani | H04L 9/3265 |
| 2013/0007442 A1 | 1/2013 | Mao et al. | |
| 2018/0076955 A1* | 3/2018 | Shields | H04L 63/06 |
| 2018/0083785 A1* | 3/2018 | Shields | H04W 12/033 |
| 2018/0316665 A1* | 11/2018 | Caldera | H04L 63/104 |
| 2019/0036778 A1* | 1/2019 | Bathen | H04L 67/1076 |
| 2020/0111080 A1* | 4/2020 | Metcalfe | H04L 9/3255 |
| 2020/0118096 A1* | 4/2020 | Yang | H04L 9/3239 |
| 2020/0127835 A1* | 4/2020 | Fletcher | H04L 9/085 |
| 2020/0153627 A1* | 5/2020 | Wentz | H04L 9/50 |
| 2020/0204346 A1* | 6/2020 | Trevethan | H04L 9/3236 |
| 2020/0213085 A1* | 7/2020 | Fletcher | H04L 9/3255 |
| 2020/0241981 A1* | 7/2020 | Ding | H04L 9/3239 |
| 2020/0285720 A1* | 9/2020 | Alsolami | G06V 40/1353 |
| 2020/0313856 A1* | 10/2020 | Basu | H04L 9/3073 |
| 2020/0344070 A1* | 10/2020 | Li | G06F 21/64 |
| 2020/0351083 A1* | 11/2020 | Bartolucci | H04L 9/30 |
| 2020/0351657 A1* | 11/2020 | Wentz | H04L 9/3231 |
| 2020/0389291 A1* | 12/2020 | Xiao | H04L 9/3239 |
| 2020/0389321 A1* | 12/2020 | Fletcher | G06Q 20/389 |
| 2021/0018953 A1* | 1/2021 | Ford | G06F 1/10 |
| 2021/0049600 A1* | 2/2021 | Spector | H04L 9/085 |
| 2021/0075600 A1* | 3/2021 | Trevethan | G06Q 20/065 |
| 2021/0091934 A1* | 3/2021 | Fletcher | H04L 9/3236 |
| 2021/0099312 A1* | 4/2021 | Guo | G06F 16/1837 |
| 2021/0158342 A1* | 5/2021 | Bartolucci | H04L 9/0643 |
| 2021/0297251 A1* | 9/2021 | Yang | H04L 9/3255 |
| 2021/0357915 A1* | 11/2021 | Makrides | G06Q 20/3674 |
| 2022/0021518 A1* | 1/2022 | Geater | H04L 9/3247 |
| 2022/0045849 A1* | 2/2022 | Jing | H04L 9/088 |
| 2022/0278854 A1* | 9/2022 | Tobkin | G06Q 20/3825 |
| 2022/0309490 A1* | 9/2022 | Basu | H04L 9/3239 |
| 2024/0144257 A1* | 5/2024 | Young | G06Q 20/3829 |

FOREIGN PATENT DOCUMENTS

| | | |
|---|---|---|
| CN | 111835528 A | 10/2020 |
| CN | 111934890 A | 11/2020 |
| CN | 112036884 A | 12/2020 |
| JP | 2018196150 A | 12/2018 |
| JP | 2020516164 A | 5/2020 |

OTHER PUBLICATIONS

Da Costa, L., et al. "Dlcp: A Protocol for Securing Light Client Operation in Blockchains", NOMS 2018—2018 IEEE/IFIP Network Operations and Management Symposium, IEEE, Apr. 23, 2018, 6 pages.
Extended European Search Report issued from the European Patent Office to EP Application No. 21205113.0 on Apr. 4, 2022, 9 pages.
Chinese Search Report, The State Intellectual Property Office of People's Republic of China, issued to CN Application No. 202011593351.X mailed Jul. 19, 2022, 4 pages.
First Chinese Office Action, The State Intellectual Property Office of People's Republic of China, issued to CN Application No. 202011593351.X on Jul. 26, 2022, 6 pages.

\* cited by examiner

GROUP SERVICE IMPLEMENTATION METHOD AND DEVICE, EQUIPMENT AND STORAGE MEDIUM

CROSS-REFERENCE TO RELATED APPLICATION(S)

This application claims priority to Chinese Patent Application No. 202011593351.x filed Dec. 29, 2020, the disclosure of which is incorporated herein by reference in its entirety.

TECHNICAL FIELD

The present disclosure relates to the technical field of computers and, in particular, to blockchain technology, which may be applied to cloud computing and cloud services.

BACKGROUND

With the development of blockchain technology, the networking degree of the blockchain is increasingly high, and the blockchain can carry more and more complex services.

At present, many service requirements need multi-party coordination to be implemented, for example, the service that needs auditing authorization. This kind of service needs to be executed by each node separately in the blockchain, so that the execution efficiency is low, and the execution mode does not match the actual service requirement.

SUMMARY

The present disclosure provides a group service implementation method and device based on a blockchain, an equipment and a storage medium.

According to a first aspect of the present disclosure, a group service implementation method based on a blockchain, executed by a blockchain node, is provided. The method includes steps described below.

A service transaction request is acquired.

In response to the service transaction request including to-be-authenticated data and a threshold signature, a signature group corresponding to the threshold signature is determined.

Group information of the signature group is acquired by querying the blockchain, where the signature group includes at least two members, the at least two members of the signature group are used for authenticating the to-be-authenticated data by adopting secure multi-party computation and generating the threshold signature for the to-be-authenticated data by adopting a signature private key, and the group information includes at least a verification public key of the threshold signature.

The threshold signature is verified by adopting the verification public key in the group information.

In response to a verification being successful, a validity of the to-be-authenticated data is determined, and the service transaction request is continuously executed.

According to a second aspect of the present disclosure, a group service implementation method based on a blockchain, executed by group members, is provided. The method includes steps described below.

A signature private key and a verification public key are generated for a group to which the group members belong.

The verification public key is configured as group information, the group information is carried in a group information issuing transaction request, and the group information issuing transaction request is issued to the blockchain for storage.

An authentication request for authenticating to-be-authenticated data is acquired.

The to-be-authenticated data is authenticated by at least two members among the group members of the group to which the group members belong by adopting secure multi-party computation, and threshold signature is performed on the to-be-authenticated data by adopting the signature private key.

The authentication request is responded to according to the threshold signature, where the threshold signature is used for being carried in a service transaction request initiated on the blockchain to enable a blockchain node to verify the threshold signature according to the verification public key stored in the blockchain.

According to a third aspect of the present disclosure, an electronic equipment is provided. The electronic equipment includes at least one processor and a memory.

The memory is communicatively connected to the at least one processor.

The memory stores instructions executable by the at least one processor, and the instructions are executed by the at least one processor to cause the at least one processor to execute the group service implementation method based on a blockchain of any embodiment of the present disclosure.

According to a fourth aspect of the present disclosure, a non-transitory computer-readable storage medium storing computer instructions is provided. The computer instructions are used for causing a computer to execute the group service implementation method based on a blockchain of any embodiment of the present disclosure.

According to the technical solution of the present disclosure, a new execution manner in which service requirements need multi-party coordination to be implemented is provided, and the execution efficiency is improved.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure.

DETAILED DESCRIPTION

Example embodiments of the present disclosure, including details of embodiments of the present disclosure, are described hereinafter in connection with the drawings to facilitate understanding. The example embodiments are illustrative only. Therefore, it is to be understood by those having ordinary skill in the art that various changes and modifications may be made to embodiments described herein without departing from the scope and spirit of the present disclosure. Similarly, description of well-known functions and constructions is omitted hereinafter for clarity and conciseness.

Figure 1:
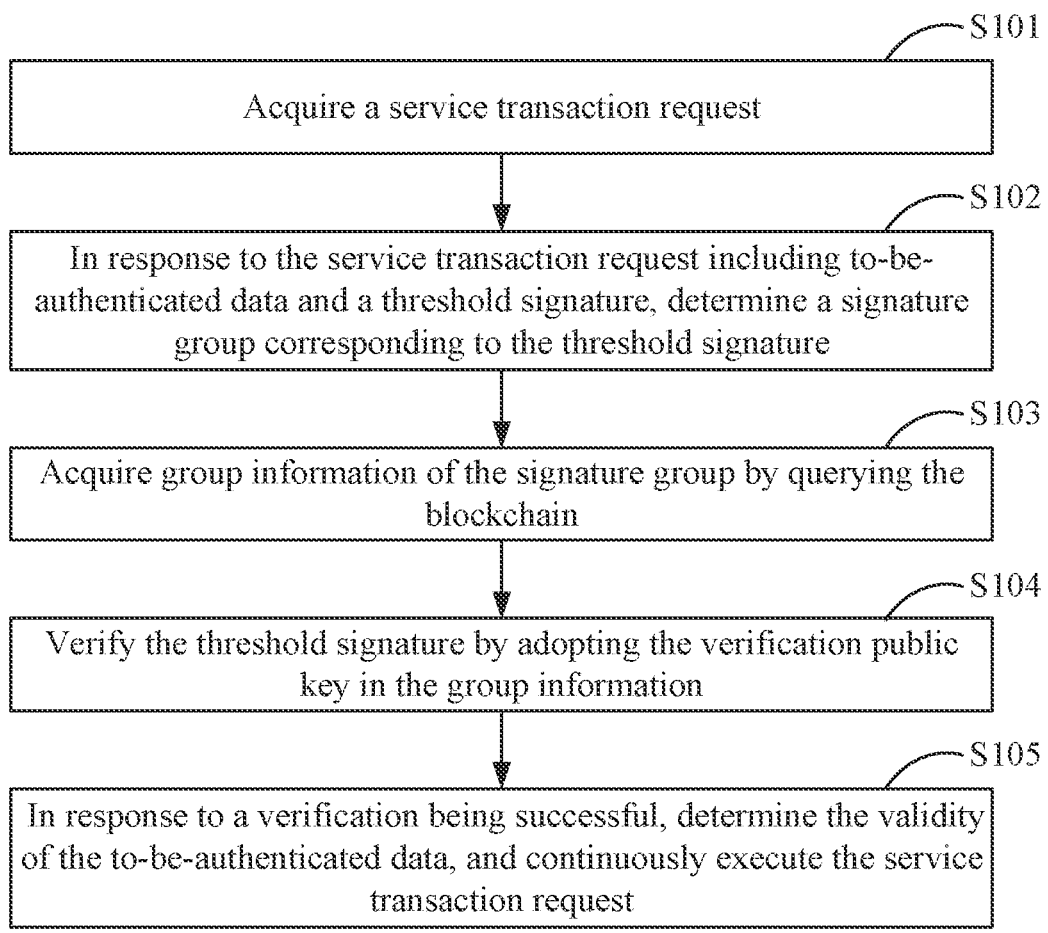
FIG. 1 is a flowchart of a group service implementation method based on a blockchain according to an embodiment of the present disclosure.

FIG. 1 is a flowchart of a group service implementation method based on a blockchain according to an embodiment of the present disclosure. The embodiment is applicable to the situation where a blockchain node executes services needing multi-party coordination to be implemented, such as auditing authorization services. The embodiment may be executed by a blockchain node (that is, a local node). The embodiment is specifically executed by a group service implementation device based on a blockchain configured in an electronic equipment where the blockchain node is located. The device may be implemented by software and/or hardware. Optionally, the blockchain node implementing the embodiment of the present disclosure may be a block generation node of a blockchain network or other nodes of the blockchain network. As shown in FIG. 1, the method includes steps described below.

In step S101, a service transaction request is acquired.

The so-called service transaction request is a transaction request used to request a blockchain node to execute a certain type of service. The service transaction request may be initiated according to a service processing smart contract when any node in a blockchain network has service processing requirements.

It should be noted that the service corresponding to the service transaction request acquired in this step may be completed by a single party, or may require multi-party coordination. If the service can be completed by a single party, the service transaction request needs to include at least to-be-processed transaction data. If the service needs to be completed through multi-party coordination, the service transaction request needs to include at least the processing data of the party having completed execution for the party having not completed execution to use. For example, if the service in the embodiment of the present disclosure needs to be executed through the coordination between an auditing and authentication party (such as a group that provides authentication services in the embodiment of the present disclosure) and a processing party (such as the blockchain node in the embodiment of the present disclosure), the service transaction request needs to include at least to-be-authenticated data and a threshold signature. The to-be-authenticated data may be data that needs to be authenticated by a group that provides authentication services, and the threshold signature is a signature result after the group authenticates the to-be-authenticated data.

Optionally, in the embodiment of the present disclosure, the service transaction request acquired by a local node may be a service transaction request sent by the local node itself or be a service transaction request sent by other nodes in the blockchain network.

In step S102, in response to the service transaction request including to-be-authenticated data and a threshold signature, a signature group corresponding to the threshold signature is determined.

The signature group may be a group that authenticates the to-be-authenticated data included in the currently acquired service transaction request. That is, the threshold signature in the service transaction request is generated when the signature group authenticates the to-be-authenticated data.

Optionally, the so-called group (such as the signature group) in the embodiment of the present disclosure is an independently constructed system that provides a certain function authentication service outside a blockchain network. The group includes at least two members (that is, group members), and the at least two members need to collaborate to authenticate the to-be-authenticated data. In the embodiment of the present disclosure, multiple authentication parties that authenticate the same type of data may be formed into a group. Each authentication party is a member of the group. In the group, at least one equipment where a member is located may be a blockchain node equipment; or all equipments where a member is located are all non-blockchain node equipments, but at least one equipment where a member is located can interact with the blockchain network through an interface provided by the blockchain network, or can interact with a node in the blockchain network in a peer-to-peer manner. Members of the group are used for authenticating the to-be-authenticated data by adopting secure multi-party computation and generating the threshold signature for the to-be-authenticated data by adopting a signature private key. Secure multi-party computation refers to the use of secure means adopted between multiple members of a group for interaction and calculation to ensure that the input information of members of all parties participating in the calculation is not exposed and at the same time accurate calculation results can be acquired. In the embodiment of the present disclosure, multiple members of the group can authenticate the to-be-authenticated data according to secure multi-party computation technology, and use the signature private key of the multiple members themselves to perform signature on the to-be-authenticated data. The signature of the multiple members can be generated as the threshold signature of the to-be-authenticated data according to a certain algorithm. It should be noted that the detailed calculation process of the threshold signature and the construction process of the group will be described in detail in subsequent embodiments.

Optionally, in the embodiment of the present disclosure, after acquiring the service transaction request, the local node needs to determine whether the service transaction request includes the to-be-authenticated data and the threshold signature. If the service transaction request does not include the to-be-authenticated data and the threshold signature, it indicates that the service transaction request is not a service executed by the group and the local node in coordination, so that at this time the service transaction request needs to be processed according to a normal processing manner of the service transaction request. For example, if the service transaction request is a regular data on-chain request which includes to-be-on-chain data, on-chain processing can be directly performed on the to-be-on-chain data. If the service transaction request includes the to-be-authenticated data and the threshold signature, it indicates that the service transaction request requires to be executed by the group and the local node in coordination, and the group has performed the authentication operation on the to-be-authenticated data and generated the threshold signature. At this time, the local node needs to further verify the authenticity of the threshold signature included in the service transaction request.

Specifically, to verify the authenticity of the threshold signature, it is necessary to determine the group that generates the threshold signature, that is, the signature group. In the embodiment of the present disclosure, determining the signature group corresponding to the threshold signature may include determining a signature group identifier (ID) of the signature group corresponding to the threshold signature. Optionally, in the embodiment of the present disclosure, the signature group identifier may be added to the service transaction request, and at this time, the signature group identifier can be directly acquired from the service transaction request; or the signature group identifier may be added to the threshold signature (for example, the threshold signature=the threshold signature+the signature group identifier), and at this time, the signature group ID can be acquired from the threshold signature.

In step S103, group information of the signature group is acquired by querying the blockchain.

The group information includes at least a verification public key of the threshold signature. The verification public key may be specifically used to verify the authenticity of the threshold signature generated by the group. A group may have one verification public key or multiple verification public keys. In the embodiment of the present disclosure, one or more verification public keys of the signature group may be queried and acquired according to a verification rule of the threshold signature.

Optionally, after determining the signature group corresponding to the threshold signature, the local node may query the group information of the signature group from the blockchain network, such as the verification public key. For example, the local node may send a group information acquisition request including the signature group identifier to the blockchain network to request other blockchain nodes to respond to the group information acquisition request and feed back the group information of the signature group corresponding to the signature group identifier. Optionally, if the local node maintains the group information of each group locally, at this time, the local node may also query locally and acquire the group information of the signature group.

It should be noted that in the embodiment of the present disclosure, the group information may further include, besides the verification public key, other information such as a group identifier, group member description information and group authentication function description information. When the group information is acquired in this step, at least the verification public key of the threshold signature needs to be acquired, and other information may or may not be acquired, which is not limited.

In step S104, the threshold signature is verified by adopting the verification public key in the group information.

Optionally, in the embodiment of the present disclosure, after the threshold signature and the group information of the signature group are obtained, the verification public key of the signature group may be acquired from the group information of the signature group, and the threshold signature included in the service transaction request is verified according to the verification public key. Many specific verification manners exist, which are not limited in the embodiment. For example, a verification smart contract may be called to verify the threshold signature according to the verification public key; or the verification public key and the threshold signature may be input into a local signature verification module, and the local signature verification module verifies the threshold signature and outputs a verification result. The threshold signature may also be verified according to a signature verification algorithm corresponding to the threshold signature stored locally and the verification public key.

It should be noted that if the threshold signature in the service transaction request is the threshold added with the signature group identifier, since the signature group identifier does not participate in the signature verification, it is necessary to verify the threshold signature after the signature group identifier is removed.

In step S105, in response to a verification being successful, the validity of the to-be-authenticated data is determined, and the service transaction request is continuously executed.

Optionally, in the embodiment of the present disclosure, if the verification on the threshold signature is successful according to the verification public key in the group information, it indicates that the to-be-authenticated data included in the service transaction request is valid, and subsequent service operations of the service transaction request can be executed according to the to-be-authenticated data. If the verification is not successful, it indicates that the to-be-authenticated data is invalid, and the subsequent processing operations of the service transaction request are stopped.

Exemplarily, if the service transaction request in the embodiment of the present disclosure is to authorize user A as a legal adviser of company 1, and the service transaction request includes user A's lawyer qualification certificate (that is, the to-be-authenticated data) and the threshold signature of the lawyer qualification certificate. In the embodiment of the present disclosure, the signature group that authenticates user A's lawyer qualification certificate may be first determined, and then the verification public key of the signature group is acquired to verify the threshold signature of the lawyer qualification certificate. If the verification is successful, the operation of authorizing user A as the legal adviser of company 1 can be continuously executed.

In the solution of the embodiment of the present disclosure, after the service transaction request including the to-be-authenticated data and the threshold signature is acquired, the signature group of the threshold signature is first determined, and the verification public key of the signature group is acquired to verify the threshold signature. If the verification is successful, the subsequent operations of the service transaction request can be continued. In the solution of the embodiment of the present disclosure, outside the blockchain network, an independent system that provides a certain function authentication service is constructed in units of groups to provide a threshold signature function for a blockchain node. On-chain storage is performed on the group information of the group. For auditing authorization services that require multi-party coordination to be implemented, in the process of executing the service transaction request, the blockchain node only needs to acquire the verification public key of the signature group from the blockchain network and then can implements the verification on the threshold signature of the to-be-authenticated data and does not need to interact with each data authentication party (that is, each member in the group). Therefore, the efficiency of executing the service transaction request is improved, and the requirements of auditing authorization services are well matched.

Optionally, in the embodiment of the present disclosure, when the service transaction request is executed, it is necessary to acquire the group information of the signature group by querying the blockchain network. Correspondingly, the solution of the embodiment of the present disclosure further includes a process of performing on-chain storage on the group information, and the process includes: a group information issuing transaction request is acquired, and the group information issuing transaction request is executed to perform on-chain storage on the group information.

Specifically, the group information issuing request may be group information issuing transaction request including the group information generated by at least one member of the group after the group construction is completed, and the at least one member sends the group information issuing transaction request to the blockchain network. If the member is a blockchain node, the member may send the group information issuing transaction request directly; if the member is not a blockchain node, the member may send the group information issuing transaction request to the blockchain network through an interface provided by the blockchain network. Alternatively, the member may transmit the group information issuing transaction request to a node of the blockchain network in a manner of offline peer-to-peer transmission. The local node can acquire the group information issuing transaction request of the group, acquires the group information needing to be issued from the group information issuing transaction request, and performs on-chain storage on the group information. Subsequently, each node in the blockchain network acquires the group information of the group from the blockchain network according to requirements. In the embodiment of the present disclosure, on-chain storage is performed on the information of each group, so that the security and openness of the group information are ensured. In addition, on-chain storage is performed on the group information, and whether the group is on-chain or off-chain, the group can provide data authentication services for the blockchain network, and it is convenient for the blockchain node to perform signature verification on the signature result.

Optionally, in actual applications, many types of data need auditing authorization. For example, the types of data may include personnel qualification authentication, unit qualification authentication and data validity authentication. Different types of data need to be authenticated by groups having different auditing functions, and for the same auditing function, multiple groups may be constructed. Therefore, in the embodiment of the present disclosure, relatively large number of groups may be constructed. In order to allow users to better understand the information of each group, in the embodiment of the present disclosure, the function of querying and displaying group information may be provided. That is, in response to a group information display request being acquired, at least one piece of group information is acquired by querying the blockchain, and the at least one piece of group information is displayed to a user. Specifically, the group information display request may be initiated when the user needs to view the group information, or may be initiated when the blockchain node needs to display the group information to the user in the process of processing the transaction request. After acquiring the group information display request, the local node may first determine a group display requirement, for example, displaying a certain group, or displaying group information of a group having a certain type of authentication function, or displaying group information of all groups, etc. The local node will query the corresponding group information of one or more groups from the blockchain network according to the group display requirement, and display the group information to the user. For example, the local node may transmit the group information to the user client for display.

Optionally, in the embodiment of the present disclosure, the group information may include the group identifier, the group member description information, the group authentication function description information and the verification public key. Therefore, the comprehensiveness of the content of the group information is improved, so that a target group can be accurately determined during subsequent data authentication. Correspondingly, in the embodiment of the present disclosure, when the group information is displayed to the user, all information of the group may be displayed, or part of the group information may be displayed according to actual requirements, which is not limited in the embodiment.

Figure 2:
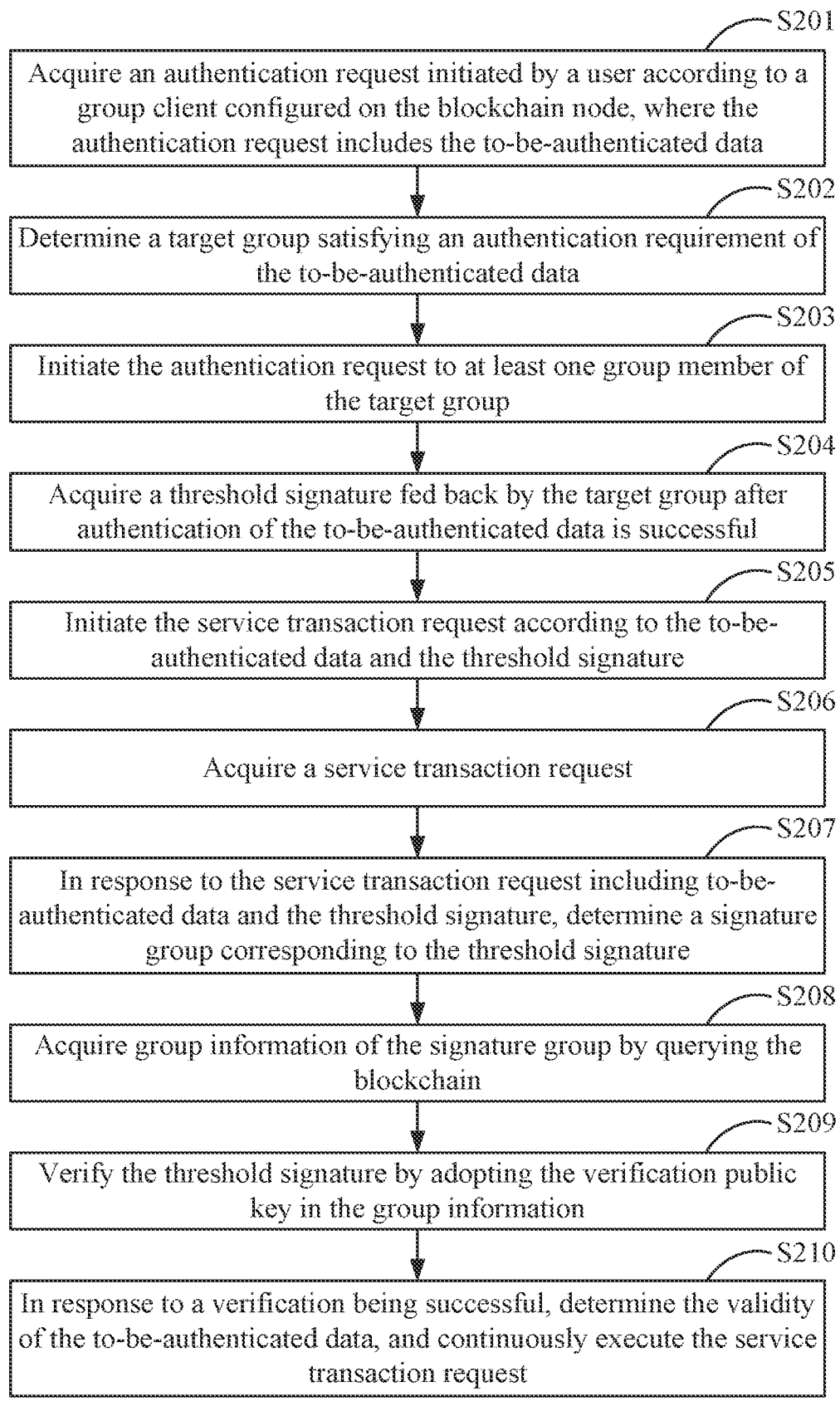
FIG. 2 is a flowchart of another group service implementation method based on a blockchain according to an embodiment of the present disclosure.

FIG. 2 is a flowchart of another group service implementation method based on a blockchain according to an embodiment of the present disclosure. On the basis of the above embodiment, this embodiment provides a detailed introduction to the situation where a service transaction request is initiated. As shown in FIG. 2, the method includes steps described below.

In step S201, an authentication request initiated by a user is acquired according to a group client configured on the blockchain node, where the authentication request includes the to-be-authenticated data.

The group client may be a client installed on the blockchain node equipment for the user to interact with the blockchain network. The user may initiate related transaction requests to the blockchain network according to the client. For example, in the embodiment, the user may initiate an authentication request including the to-be-authenticated data to the blockchain network according to the client. The authentication request is used to request the blockchain node to authenticate the to-be-authenticated data included in the authentication request.

Optionally, the local node may acquire the authentication request initiated by the user according to the group client configured on the local node itself, or may acquire the authentication request sent by other nodes in the blockchain network.

In step S202, a target group satisfying an authentication requirement of the to-be-authenticated data is determined.

The so-called target group may be a group that needs to authenticate the to-be-authenticated data. The group is referred to as the target group before authenticating the to-be-authenticated data, and is referred to as the signature group after authenticating the to-be-authenticated data.

Optionally, in the embodiment of the present disclosure, different groups have different authentication functions, and the same authentication function may correspond to multiple groups, so that after acquiring the authentication request, the local node needs to determine the target group satisfying the authentication requirement of the to-be-authenticated data from multiple groups issued in the blockchain network according to the to-be-authenticated data included in the authentication request. Many specific determination manners exist, which are not limited in the embodiment. Examples are described below.

In manner one, the target group specified by a user in the authentication request and satisfying the authentication requirement is acquired.

Specifically, when the user generates an authentication request, the target group may be specified from various groups issued in the blockchain network according to the authentication requirement of the user, and a group identifier of the target group is added to the authentication request. For example, the user may preset a target group satisfying the authentication requirement of the user and initiate a group information display request including an identifier of the target group to the blockchain network according to the group client. The local node responds to the group information display request and acquires the identifier of the target group specified by the user from the group information display request.

In manner two, issued group information is queried from the blockchain, and at least one group matched with the authentication requirement is determined as the target group according to authentication function description information of the group information.

Specifically, when the local node needs to determine the target group, the local node may also query the group information of issued groups from the blockchain network, then match the authentication function description information (that is, the authentication function that the group can executed) recorded in the group information of the issued groups with the authentication requirement corresponding to the to-be-authenticated data in the authentication request, and select at least one successfully matched group from the issued groups as the target group. Optionally, an optimal group may be selected from the successfully matched groups as the target group, or all the successfully matched groups may be configured as target groups.

In manner three, the issued group information is queried from the blockchain, a candidate group matched with the authentication requirement is determined according to the authentication function description information of the group information, a query request of whether the candidate group can undertake the authentication task of this time is sent to the candidate group, and the candidate group feeding back capable of undertaking the authentication task of this time is configured as the target group.

In the embodiment of the present disclosure, any of the above manners can be selected according to actual requirements to execute the operation of determining the target group satisfying the authentication requirement of the to-be-authenticated data in this step, so that the flexibility and accuracy of target group determination are improved.

In step S203, the authentication request is initiated to at least one group member of the target group.

Optionally, after the target group satisfying the authentication request (that is, the to-be-authenticated data in the authentication request) is determined, the authentication request may be initiated to the target group. The blockchain node of the embodiment of the present disclosure may initiate the authentication request to at least one group member of the target group in an offline peer-to-peer manner.

Optionally, the local node may also initiate the authentication request online to at least one group member of the target group (at this time, the authentication request may be an authentication transaction request). Specifically, if only one member of the target group belongs to the blockchain node, the authentication request is initiated to this member; if multiple members of the target group belong to the blockchain node, one member may be selected and the authentication request is initiated to the one member, or the authentication request may be initiated to all of the multiple members. If various member nodes of the target group are not blockchain nodes, the authentication request may be initiated to a member among various members who can interact with the blockchain network through the interface provided by the blockchain network. Alternatively, the authentication request may be initiated in the above manner of peer-to-peer transmission.

Optionally, if multiple target groups are determined in step S202, in this step, the authentication request may be initiated to one of the multiple target groups or be initiated to all of the multiple target groups.

In step S204, a threshold signature fed back by the target group after authentication of the to-be-authenticated data is successful is acquired.

Optionally, after at least one member of the target group acquires the authentication request, the authentication request may be sent to each member of the group, and each member will use secure multi-party computation to authenticate the to-be-authenticated data and generate the threshold signature for the to-be-authenticated data by adopting a signature private key. If the final result is that the authentication is successful, the threshold signature is generated and fed back by at least one member node of the group to the blockchain network. The local node acquires the threshold signature fed back by at least one member of the target group. Optionally, the member feeding back the threshold signature may be the same member as the group member receiving the authentication request or not, which is not limited in the embodiment.

Optionally, when the local node acquires the threshold signature fed back by the target group in this step, the local node may acquire the threshold signature through on-chain or offline peer-to-peer interaction with the member of the target group, which is not limited.

Optionally, if in S203 the authentication request is initiated to multiple target groups, in this step, the threshold signature fed back by any target group after the authentication of the to-be-authenticated data is successful is acquired.

In step S205, the service transaction request is initiated according to the to-be-authenticated data and the threshold signature.

Optionally, the local node may call a service smart contract, generate the service transaction request according to the to-be-authenticated data and the threshold signature, and send the generated service transaction request to the blockchain network.

In step S206, a service transaction request is acquired.

Optionally, the local node may acquire the service transaction request sent by the local node itself, or acquire the service transaction request forwarded by other nodes in the blockchain. Since the service transaction request is initiated according to the to-be-authenticated data and the threshold signature, the service transaction request must include the to-be-authenticated data and the threshold signature, so that at this time, the local node needs to execute subsequent operations of steps S207 to S210 according to the service transaction request.

In step S207, in response to the service transaction request including to-be-authenticated data and a threshold signature, a signature group corresponding to the threshold signature is determined.

It should be noted that the signature group determined in the embodiment may be the target group feeding back the threshold signature in step S204.

In step S208, group information of the signature group is acquired by querying the blockchain.

In step S209, the threshold signature is verified by adopting the verification public key in the group information.

In step S210, in response to a verification being successful, the validity of the to-be-authenticated data is determined, and the service transaction request is continuously executed.

According to the technical solution of the embodiment of the present disclosure, the authentication request including the to-be-authenticated data initiated by the user according to the group client is acquired, the target group capable of authenticating the to-be-authenticated data is determined, the authentication request is initiated to at least one member of the target group, and the threshold signature fed back by the target group is received. The service transaction request is initiated according to the threshold signature and the to-be-authenticated data and is sent to the blockchain network, and the service transaction request is acquired. The signature group corresponding to the threshold signature included in the service transaction request is first determined, and the verification public key of the signature group is acquired to verify the threshold signature. If the verification is successful, subsequent operations of the service transaction request can be continued. The solution of the embodiment of the present disclosure shows the process of according to the authentication request initiated by the user, how the blockchain node determines the target group and interacts with the target group to complete the authentication and signature of the to-be-authenticated data. In this process, the blockchain node does not need to interact with each member of the group, and only needs to interact with at least one member of the group. Therefore, the efficiency of authenticating the to-be-authenticated data is improved, thereby the execution efficiency of processing the service transaction request including the to-be-authenticated data and the threshold signature is improved, and the requirements of auditing authorization services are well matched.

Optionally, the above three manners described in the embodiment of the present disclosure for determining the target group satisfying the authentication requirement of the to-be-authenticated data are all to determine the target group offline by the local node, that is, the determination process does not need the participation of other nodes of the blockchain, and on-chain operations will not be performed on the related information of the determination process. In addition, in the embodiment of the present disclosure, an on-chain manner may also be adopted to determine the target group satisfying the authentication requirement of the to-be-authenticated data. Specifically, the local node may initiate a target group determination request to the blockchain network, and the target group determination request includes at least: the authentication requirement of the to-be-authenticated data. Other nodes of the blockchain network are requested to respond to the target group determination request, at least one group satisfying the authentication requirement is determined from the issued groups of the blockchain network as the target group and is fed back to the local node, and on-chain storage is performed on the target group determination request and the finally determined target group.

Optionally, sometimes when a user initiates an authentication request, the user may not know that the to-be-authenticated data in the authentication request needs authentication and signature by a group, and thus the user will not specify a target group satisfying the authentication requirement in the authentication request. For example, an authentication request sent by user A is to authorize and authenticate user A as a legal adviser of company 1. At this time, although the authentication request includes user A's lawyer qualification certificate, user A does not know that the blockchain node needs perform authentication and signature on user A's lawyer qualification certificate, so that user A will not specify which target group to perform authentication and signature on user A's lawyer qualification certificate. At this time, the above manner two, manner three or on-chain manner are generally adopted to determine the target group. After initiating the authentication request to the target group and acquiring the threshold signature of the to-be-authenticated data by the target group, the local node generates the service transaction request according to the to-be-authenticated data and the threshold signature and executes the service transaction request, and at this time, the processing of the authentication request initiated by the user is completed. For example, after acquiring the threshold signature of user A's lawyer qualification certificate by the target group, the local node generates a service transaction request for authorizing and authenticating user A as the legal adviser of company 1 according to the threshold signature and user A's lawyer qualification certificate, and sends the service transaction request to the blockchain network, so that the blockchain node responds to the service transaction request, and after the verification of the threshold signature included in the service transaction request is successful, the local node authorizes user A to be the legal adviser of company 1.

Figure 3:
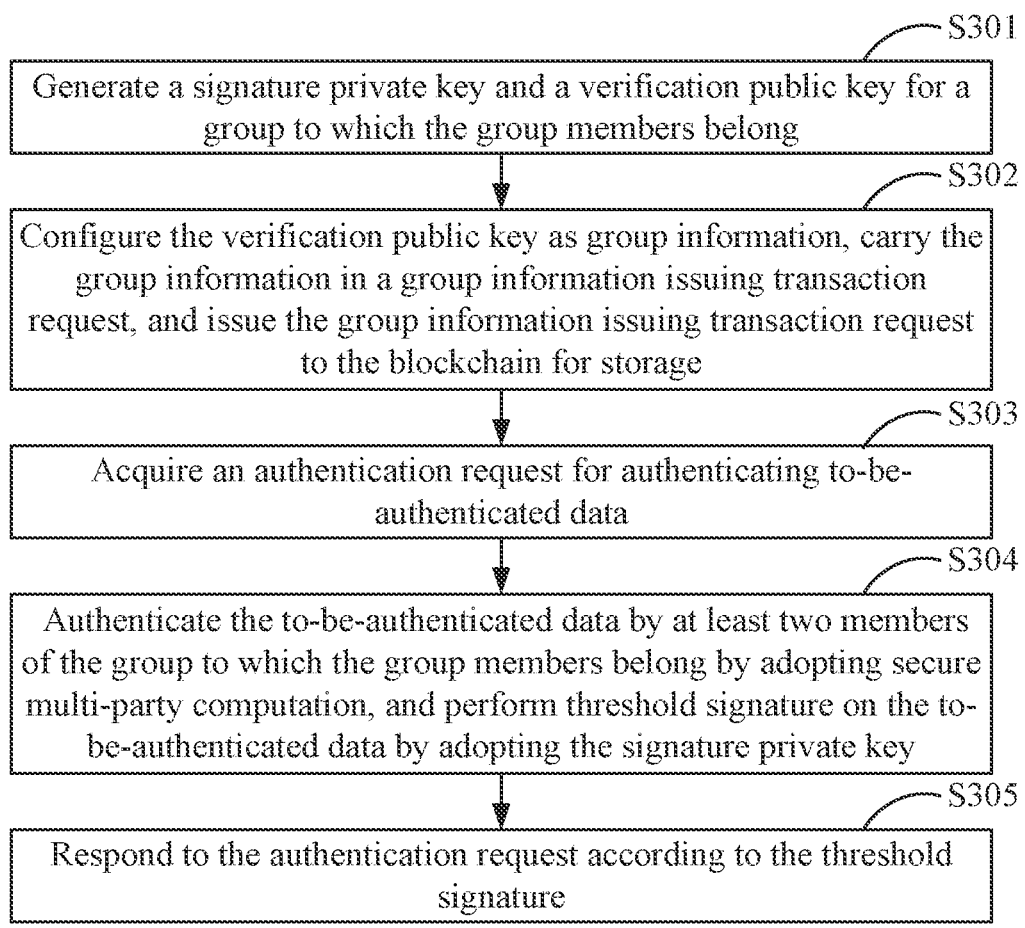
FIG. 3 is a flowchart of another group service implementation method based on a blockchain according to an embodiment of the present disclosure.

FIG. 3 is a flowchart of another group service implementation method based on a blockchain according to an embodiment of the present disclosure. The embodiment is applicable to the situation where group members execute services needing multi-party coordination to be implemented, such as auditing authorization services. The embodiment may be executed by group members (that is, a local node), specifically executed by a group service implementation device based on a blockchain configured in an equipment where the group members are located. The device may be implemented by software and/or hardware. Optionally, the equipment where the group members are located may be a blockchain network node or may not be a blockchain network node. As shown in FIG. 3, the method includes steps described below.

In step S301, a signature private key and a verification public key are generated for a group to which the group members belong.

The so-called group (such as a signature group) in the embodiment of the present disclosure is to construct an independent system that provides a certain function authentication service outside a blockchain network. The group includes at least two members (that is, the group members). In the embodiment of the present disclosure, the signature private key of the group is composed of the signature private key of each member of the group. Each member can use the signature private key of the each member itself to perform signature on to-be-authenticated data, and the signature private key of each member is generally in charge of the each member itself. The verification public key of the group is the public key used to authenticate a threshold signature generated by the group. For a group, the number of verification public keys may be one or multiple. The verification public key of the group is generally open to the blockchain network. For example, the verification public key is generally stored in the blockchain network.

In the embodiment of the present disclosure, the signature private key and the verification public key may be generated for the group to which the group members belong in many manners, which is not limited in the embodiment. For example, when the signature private key is generated for the group to which the group members belong, each member in the group may generate a private key signature of the each member itself according to a preset private key generation algorithm; or any of the group members (such as a local member) may generate a private key signatures for each member of the group according to personal data provided by each member (such as a random string provided by each member or personal identifier, etc.) and according to the preset private key generation algorithm, and allocate the private key signature to each member of the group. Optionally, to ensure the privacy of the private key of each member, in the embodiment, it is preferred that each member generates the signature private key of the each member itself. When the verification public key is generated for the group to which the group members belong, each member of the group may generate a public key of the each member itself according to a preset public key generation algorithm and send the public key to a member of the group (such as a local member), and then the local member processes the public key of each member according to a certain algorithm to obtain the verification public key of the group; or the local member itself may generate one or more public keys as the public key for authentication of the group according to a preset algorithm, etc.

Optionally, in the embodiment of the present disclosure, other manners may also be adopted to generate the signature private key and the verification public key for the group to which the group members belong. However, it should be noted that in the embodiment of the present disclosure, no matter what manner is adopted to generate the signature private key and the verification public key for the group, each member is required to participate in the generation process. The generation operation of the signature private key and verification public key of the group should not be executed by only one member.

In step S302, the verification public key is configured as group information, the group information is carried in a group information issuing transaction request, and the group information issuing transaction request is issued to the blockchain for storage.

Optionally, in the embodiment of the present disclosure, after generating the signature private key and the verification public key for the group to which the group members belong, the local member may configure the verification public key of the group to which the group members belong as the group information of the group to which the group members belong, generate a group information issuing request according to the group information and send the group information issuing request to the blockchain network, so that the blockchain node acquires and executes the group information issuing transaction request so as to perform on-chain storage on the group information (that is, the verification public key of the group). It is convenient for subsequent blockchain nodes to directly acquire, when needing to query the group information of issued groups, the group information from the blockchain network.

For example, if the group corresponding to the on-chain group information issued this time is the signature group corresponding to the threshold signature of a certain service transaction request, during the process of processing the service transaction request, the blockchain node may acquire the verification public key of the signature group by querying the blockchain network to verify the threshold signature in the service transaction request.

Optionally, to prevent one group member from cheating during the operation of this step, in the embodiment of the present disclosure, multiple group members in the group who can interact with the blockchain network may be selected to execute the operation of this step. Multiple group members may supervise and verify each other to ensure the accuracy of the on-chain stored group information.

In step S303, an authentication request for authenticating to-be-authenticated data is acquired.

Optionally, in the embodiment of the present disclosure, when acquiring the authentication request including the to-be-authenticated data and initiated by a user according to a group client configured on the blockchain node, the blockchain node will determine a target group satisfying the authentication requirement of the to-be-authenticated data and send the authentication request including the to-be-authenticated data to at least one group member, so as to request each group member of the target group to authenticate the to-be-authenticated data. If the local member belongs to the target group, the local member may acquire the authentication request initiated by the blockchain node and authenticate the to-be-authenticated data included in the authentication request.

Specifically, the blockchain node sends the authentication request to group members in different manners, so that the local member acquires the authentication request in different manners. Specifically, the manners may include and not limited to two manners for acquisition described below.

In manner one, an authentication transaction request initiated by the blockchain node on the chain and for authenticating the to-be-authenticated data is acquired. Specifically, if the blockchain node generates an authentication transaction request for authenticating the to-be-authenticated data according to the to-be-authenticated data, and initiates the authentication request to the group members (such as the local member) of the target group (that is, the group needing to undertake the authentication task of this time) according to the blockchain network (that is, on the chain), at this time, the local member will acquire the authentication transaction request for authenticating the to-be-authenticated data initiated by the blockchain node on the chain through manner one. For example, if the blockchain node broadcasts the authentication request in the blockchain network, the local member of the target group, as the blockchain node, will acquire the authentication transaction request in the blockchain network (that is, on the chain).

In manner two, an authentication request of the blockchain node during peer-to-peer transmission and for authenticating the to-be-authenticated data is acquired. Specifically, if the blockchain node generates an authentication request for authenticating the to-be-authenticated data according to the to-be-authenticated data, and transmits the authentication request to the group members (such as the local member) of the target group (that is, the group needing to undertake the authentication task of this time) offline in a peer-to-peer manner, the local member will acquire the authentication request for authenticating the to-be-authenticated data transmitted by the blockchain node during the peer-to-peer transmission through manner two.

In the embodiment of the present disclosure, when the blockchain node transmits the authentication request to the group members, the blockchain node may choose to transmit on-chain or offline and may choose according to actual requirements, which is more flexible.

In step S304, the to-be-authenticated data is authenticated by at least two members of the group to which the group members belong by adopting secure multi-party computation, and threshold signature is performed on the to-be-authenticated data by adopting the signature private key.

Optionally, after receiving the authentication request, the local member will transmit the authentication request to at least two group members of the group, and each group member that receives the authentication request will adopt secure multi-party computation technology to authenticate the to-be-authenticated data, adopt the signature private key of the each member itself to perform distributed collaborative signature on the to-be-authenticated data after completing authentication and obtain the threshold signature. If the number of group members participating in the threshold signature of this time reaches a minimum threshold, the generated threshold signature is valid. For example, it is assumed that 10 group members are in the group, and the minimum threshold is 6 members. If the threshold signature is obtained by at least 6 members in the group performing authentication and signature, the threshold signature takes effect, that is, the subsequent operation of step 305 may be executed according to the threshold signature.

Optionally, when authenticating the to-be-authenticated data, each group member may determine whether the to-be-authenticated data is true, valid, and legal according to authentication rules preset in the group. When performing threshold signature on the to-be-authenticated data, each group member may configure the signature private key of the each group member itself and the authentication result as private input, configure the to-be-authenticated data as public input, and adopt secure multi-party computation technology to perform one time of joint signature calculation to obtain the threshold signature. In this process, the privacy of secure multi-party computation ensures that each group member participating in the signature of this time cannot obtain the private key information and authentication result of other group members while each group member can obtain signatures of other group members. Therefore, the security and temper resistance of the obtained threshold signature are ensured.

Optionally, when performing distributed collaborative signature on the to-be-authenticated data, each group member may perform authentication and signature in parallel or serially, and the specific authentication manner and the manner for generating the threshold signature are not limited in the embodiment.

In step S305, the authentication request is responded to according to the threshold signature.

Optionally, the process of the local member responding to the authentication request according to the threshold signature may be to feed back the threshold signature obtained in step S304 to the initiator of the authentication request, such as the blockchain node initiating the authentication request to the local member. After receiving the threshold signature fed back by the group member, the initiator of the authentication request may carry the threshold signature in the service transaction request initiated on the blockchain to enable the blockchain node to verify the threshold signature according to the verification public key stored in the blockchain. For example, the initiator of the authentication request may initiate the service transaction request according to the threshold signature and the to-be-authenticated data and send the service transaction request to the blockchain network. The blockchain node receives and responds to the service transaction request, determines the signature group corresponding to the threshold signature, acquires the group information of the signature group by querying the blockchain and adopts the verification public key in the group information to verify the threshold signature. If the verification is successful, the validity of the to-be-authenticated data is determined, and the service transaction request is continuously executed.

It should be noted that in the embodiment of the present disclosure, one group member may execute the operation of responding to the authentication request according to the threshold signature. To prevent one group member from cheating when responding, multiple group members may respond to the authentication request according to the threshold signature. Preferably, the group member who acquires the authentication request may be selected to execute the operation of responding to the authentication request in this step.

In the technical solution of the embodiment of the present disclosure, the group members generate the signature private key and the verification public key for the group to which the group members belong, and carry the verification public key in the group information issuing transaction request for on-chain storage. When the authentication request for authenticating the to-be-authenticated data by the user is acquired, at least two members of the group to which the group members belong adopt secure multi-party computation to authenticate the to-be-authenticated data, adopt the signature private key to perform threshold signature on the to-be-authenticated data, and respond to the authentication request according to the threshold signature. In the solution of the embodiment of the present disclosure, outside the blockchain network, an independent system that provides a certain function authentication service is constructed in units of groups to provide a threshold signature service for a blockchain node. On-chain storage is performed on the group information of the group, so that the openness and security of the group information is ensured, and at the same time, it is convenient for the blockchain node to quickly find the group information of the issued groups when executing the service transaction request related to the threshold signature. Therefore, the efficiency of executing the service transaction request is improved, and the requirements of auditing authorization services are well matched.

Optionally, in the embodiment of the present disclosure, the group members are clients deployed at the blockchain node, or clients independent of the blockchain node. Specifically, the group members may be clients deployed on the equipment where the blockchain node is located, or may be clients deployed independent of the equipment where the blockchain node is located. That is, the group members in the embodiment of the present disclosure may be nodes of the blockchain network, or nodes independent of the blockchain network. For clients that are independent of the blockchain network, some can interact with the blockchain network through the interface provided by the blockchain network, and some cannot, which is not limited in the embodiment. Therefore, the flexibility of deploying group members as clients is improved.

Optionally, in the embodiment of the present disclosure, the group members belong to one or more groups, and each group has the same or different authentication functions. The authentication function includes at least one of: personnel qualification authentication (such as lawyer qualification authentication, teacher qualification authentication, accountant qualification authentication, etc.), unit qualification authentication (such as enterprise business license authentication, tax registration authentication, etc.) and data validity authentication (authorization data validity authentication, review qualification validity authentication, etc.). For example, for group member A, group member A may participate in multiple groups, that is, group 1, group 2, and group 3, according to the qualification of group member A itself. Group 1 and group 2 are used to authenticate personnel qualification, and group 3 is used to authenticate unit qualification, which is more flexible.

Figure 4:
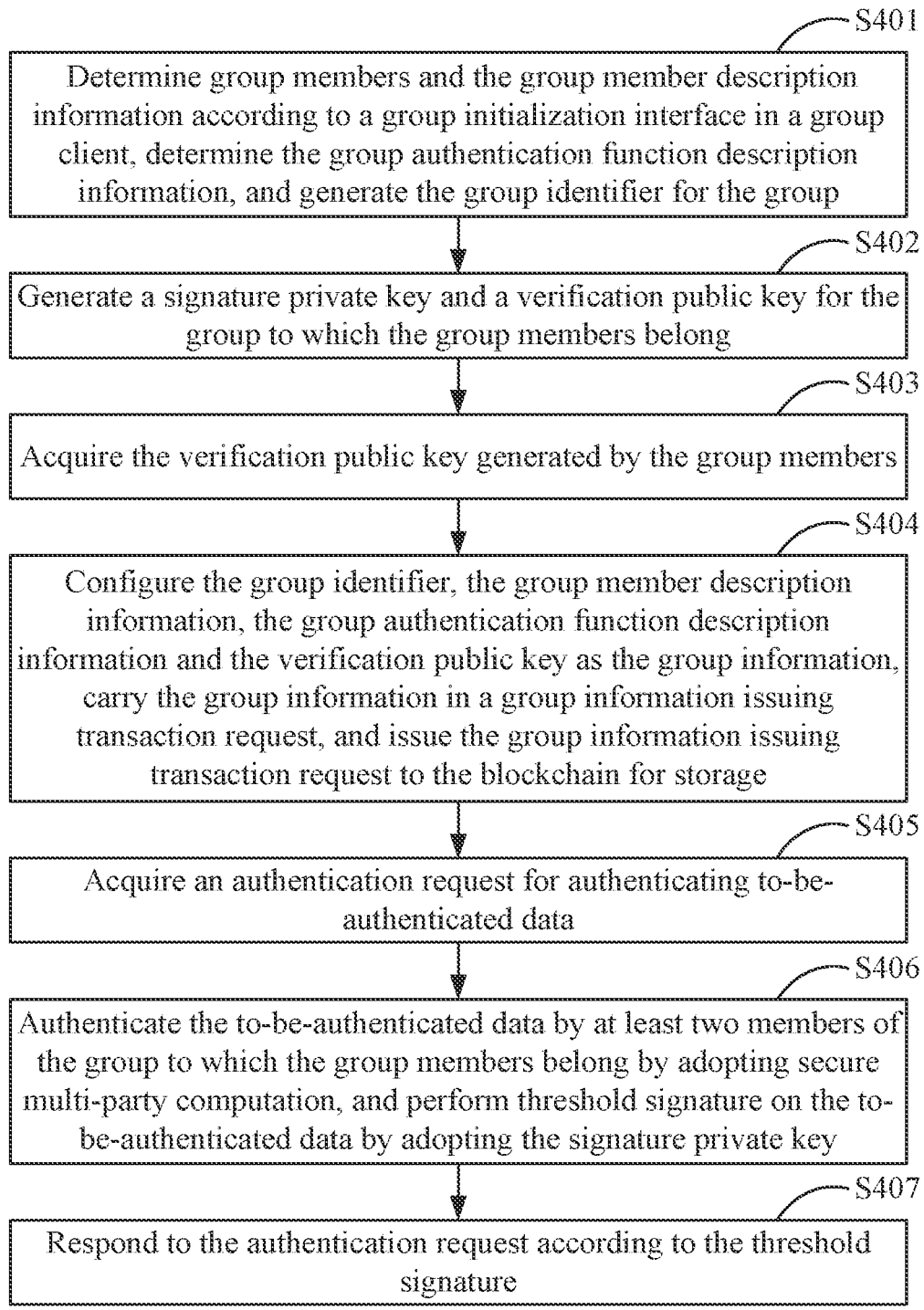
FIG. 4 is a flowchart of another group service implementation method based on a blockchain according to an embodiment of the present disclosure.

FIG. 4 is a flowchart of another group service implementation method based on a blockchain according to an embodiment of the present disclosure. On the basis of the above embodiment, this embodiment provides a detailed introduction to the situation where group members construct a group and generate group information. As shown in FIG. 4, the method includes steps described below.

In step S401, group members and the group member description information are determined according to a group initialization interface in a group client, the group authentication function description information is determined, and the group identifier is generated for the group.

In the embodiment of the present disclosure, the group client may be a group client deployed on a blockchain node, or a client deployed independent of the blockchain node, and the group client may be an operation interface for a group user to provide group management (such as group creation) or execute the operation of authentication and signature. The client is provided with an initialization interface. The initialization interface may be a service interface provided on the group client for initializing the construction of a group. Each member can create a new group for implementing a certain authentication function according to the initialization interface on the client.

Optionally, in the embodiment of the present disclosure, when at least two members negotiate offline to form a group, the at least two members negotiate what the authentication function of the newly created group is and which members can participate in the newly created group. Then, one member (such as a local member) is selected as an organization member. According to the content of the negotiation, each group member entering the group, the description information (such as the name of the group member, the node where the group member is located, the group to which the group members belong, the serial number of the group to which the group members belong, etc.) of the each member and the authentication function description information (such as at least one of the personnel qualification authentication, the unit qualification authentication or the data validity authentication) of the group are input through the group initialization interface of the group client of the one member itself. At this time, the group client can determine the group members that form the new group, the group member description information and the group authentication function description information according to the information input into the group initialization interface.

Optionally, in the embodiment of the present disclosure when the group identifier for the group is generated, the group identifier may be determined offline by the local member and then be input into the group initialization interface, or the group identifier may be generated by the group client for the newly formed group according to the data input by the user or random data or the like. For example, a preset algorithm may be adopted to generate a relatively large number for the group as the group identifier of the group. In the embodiment of the present disclosure, a relatively large number is selected as the group identifier, so that the repetition probability of identifiers of different groups is reduced, and the uniqueness of the identifier of each group is indirectly ensured. Optionally, in the embodiment of the present disclosure, different group identifiers may further be allocated by a mechanism to each group, which is not limited.

In step S402, a signature private key and a verification public key are generated for the group to which the group members belong.

In step S403, the verification public key generated by the group members is acquired.

In step S404, the group identifier, the group member description information, the group authentication function description information and the verification public key are configured as the group information, the group information is carried in a group information issuing transaction request, and the group information issuing transaction request is issued to the blockchain for storage.

Optionally, in the embodiment of the present disclosure, after the group members, the group member description information, the group authentication function description information, the group identifier and the signature private key and the verification public key of the group are determined, the process of forming the group is completed. At this time, to enable each node in the blockchain network to know the group, the member node of the group (such as the local member) needs to acquire the verification public key generated by the group members, the verification public key, the group identifier, the group member description information and the group authentication function description information are together configured as the group information of the group, and then the group information issuing transaction request including the group information is generated and is sent to the blockchain network, so that the blockchain node acquires the group information issuing transaction request and executes the group information issuing transaction request, so as to perform on-chain storage on the group information.

Optionally, in the embodiment of the present disclosure, the group information on which on-chain storage is performed includes the group identifier, the group member description information, the group authentication function description information and the verification public key. The advantage of this setting is that the group information stored on chain is more comprehensive, so that the blockchain node can fully understand the related information of each group.

In step S405, an authentication request for authenticating to-be-authenticated data is acquired.

In step S406, the to-be-authenticated data is authenticated by at least two members of the group to which the group members belong by adopting secure multi-party computation, and threshold signature is performed on the to-be-authenticated data by adopting the signature private key.

In step S407, the authentication request is responded to according to the threshold signature.

The threshold signature is used for being carried in the service transaction request initiated on the blockchain to enable the blockchain node to verify the threshold signature according to the verification public key stored in the blockchain.

In the technical solution of the embodiment of the present disclosure, when intending to form a group, the group members determine the group members, the group member description information, the group client and the group identifier according to the group initialization interface in the group client, and generate the signature private key and the verification public key for the group to which the group members belong. Then, the group identifier, the group member description information, the group authentication function description information and the verification public key are together configured as the group information, and on-chain storage is performed on the group information. When the authentication request for authenticating the to-be-authenticated data by the user is acquired, at least two members of the group to which the group members belong adopt secure multi-party computation to authenticate the to-be-authenticated data, adopt the signature private key to perform threshold signature on the to-be-authenticated data, and respond to the authentication request according to the threshold signature. In the solution of the present disclosure, after the group is constructed, it is necessary to perform on-chain storage on the group information, that is, the group identifier, the group member description information, the group authentication function description information and the verification public key. In the embodiment, detailed introduction information of each issued group is stored in the blockchain, so that the openness and security of the group information is ensured, and at the same time, it is convenient for the blockchain node to quickly find the group information of the issued groups when executing the service transaction request related to the threshold signature. Therefore, the efficiency of executing the service transaction request is improved, and the requirements of auditing authorization services are well matched.

Figure 5:
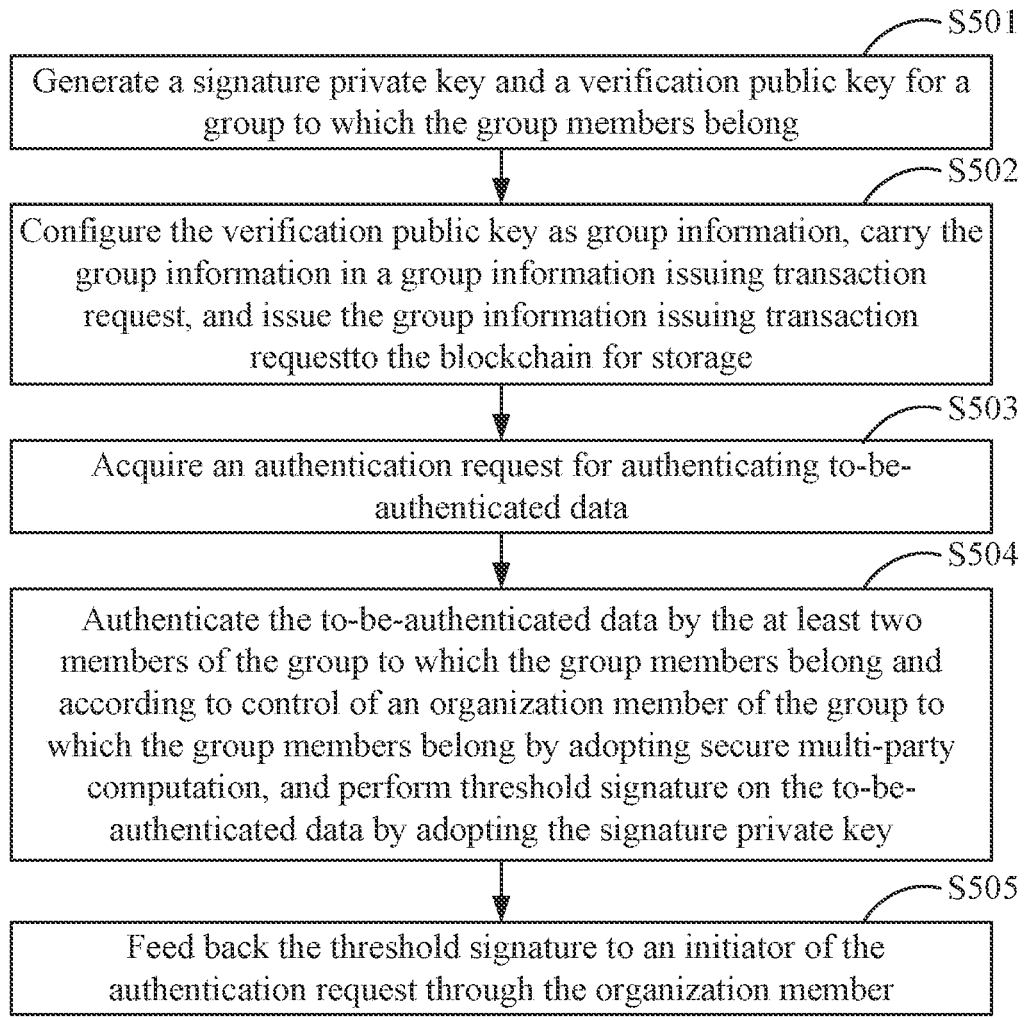
FIG. 5 is a flowchart of another group service implementation method based on a blockchain according to an embodiment of the present disclosure.

FIG. 5 is a flowchart of another group service implementation method based on a blockchain according to an embodiment of the present disclosure. On the basis of the above embodiment, this embodiment provides a detailed introduction to the situation where the to-be-authenticated data is authenticated by at least two members of the group to which the group members belong by adopting secure multi-party computation, and threshold signature is performed on the to-be-authenticated data by adopting the signature private key. As shown in FIG. 5, the method includes steps described below.

In step S501, a signature private key and a verification public key are generated for a group to which the group members belong.

In step S502, the verification public key is configured as group information, the group information is carried in a group information issuing transaction request, and the group information issuing transaction request is issued to the blockchain for storage.

In step S503, an authentication request for authenticating to-be-authenticated data is acquired.

In step S504, the to-be-authenticated data is authenticated by the at least two members of the group to which the group members belong and according to control of an organization member of the group to which the group members belong by adopting secure multi-party computation, and threshold signature is performed on the to-be-authenticated data by adopting the signature private key.

The organization member of the group may be the group member who organizes and constructs the group, or the group member who organizes the authentication and signature process of this time. For example, the member (that is, the local member) of the group who acquires the authentication request of this time as the organization member of the authentication and signature process of this time. For a group, the organization member may be fixed or not, which is not limited.

Optionally, in the embodiment of the present disclosure, each member of the group is subject to the organizational control of the organization member of the group to which the group members belong. The to-be-authenticated data is authenticated by adopting secure multi-party computation, and threshold signature is performed on the to-be-authenticated data by adopting the signature private key. For example, the organization member may, according to a minimum threshold value of the threshold signature, select at least two members from all members of the group to authenticate the to-be-authenticated data by adopting secure multi-party computation, and adopt the signature private key to perform threshold signature on the to-be-authenticated data. For example, the minimum threshold value of the threshold signature is 6, so that at least 6 members may be selected from 10 members of the group to authenticate the to-be-authenticated data by adopting secure multi-party computation, and the signature private key is adopted to perform threshold signature on the to-be-authenticated data. When which members are selected to participate in the authentication and signature process of this time, the members may be selected randomly, or according to the wishes of each member, or according to other principles, etc., which is not limited. The specific authentication and signature process related at least two members has been illustrated in the above embodiment, which is not repeated herein.

In step S505, the threshold signature is fed back to an initiator of the authentication request through the organization member.

The threshold signature is used for being carried in the service transaction request initiated on the blockchain to enable the blockchain node to verify the threshold signature according to the verification public key stored in the blockchain.

Optionally, in the embodiment of the present disclosure, the organization member may respond to the authentication request and feed back the group members participating the threshold signature to the initiator of the authentication request. That is, the organization member of the group controls the authentication and signature of the to-be-authenticated data, and the organization member feedbacks the threshold signature to the initiator of the authentication request.

In the technical solution of the embodiment of the present disclosure, the group members generate the signature private key and the verification public key for the group to which the group members belong, and carry the verification public key in the group information issuing transaction request for on-chain storage. When the authentication request for authenticating the to-be-authenticated data by the user is acquired, the organization member of the group to which the group members belong controls at least two members of the group to which the group members belong to adopt secure multi-party computation to authenticate the to-be-authenticated data and to adopt the signature private key to perform threshold signature on the to-be-authenticated data, and the organization member feeds back the threshold signature to the initiator of the authentication request. In the solution of the embodiment of the present disclosure, the organization member of the group controls the authentication and signature of the to-be-authenticated data, and the organization member feeds back the threshold signature to the initiator of the authentication request, so as to facilitate the management of the group executing the authentication request.

Optionally, in the embodiment of the present disclosure, according to the control of the organization member of the group to which the group members belong, when at least two members of the group to which the group members belong adopt secure multi-party computation to authenticate the to-be-authenticated data and adopt the signature private key to perform threshold signature on the to-be-authenticated data, if the local member is the organization member, the local member informs the at least two members of the group to which the group members belong of adopting secure multi-party computation to authenticate the to-be-authenticated data and adopting the signature private key to perform threshold signature on the to-be-authenticated data; the local member receives the threshold signature fed back by the group members and counts the number of group members actually participating in the threshold signature of this time; if the number reaches the minimum threshold, the local member informs other group members of stopping executing authentication. Specifically, if the local member is the organization member, the local member may select at least two members from the group to execute the operation of authentication and signature of this time, inform the at least two members (for example, inform all of the group members) of adopting secure multi-party computation to authenticate the to-be-authenticated data and adopting the signature private key to perform threshold signature on the to-be-authenticated data. The local node acquires the threshold signature fed back by the informed at least two members and counts the number of group members (for example, 6 group members) actually participating in the threshold signature of this time. If the number reaches the minimum threshold value (for example, the minimum threshold value is 6), it indicates that the threshold signature acquired currently has taken effect, and the remaining members (for example, the remaining 4 members) do not need to continue the authentication. Therefore, the local member needs to inform the remaining members of stopping executing the authentication operation. The advantage of this setting is that the computing power for the group to execute the authentication request is saved.

Figure 6A:
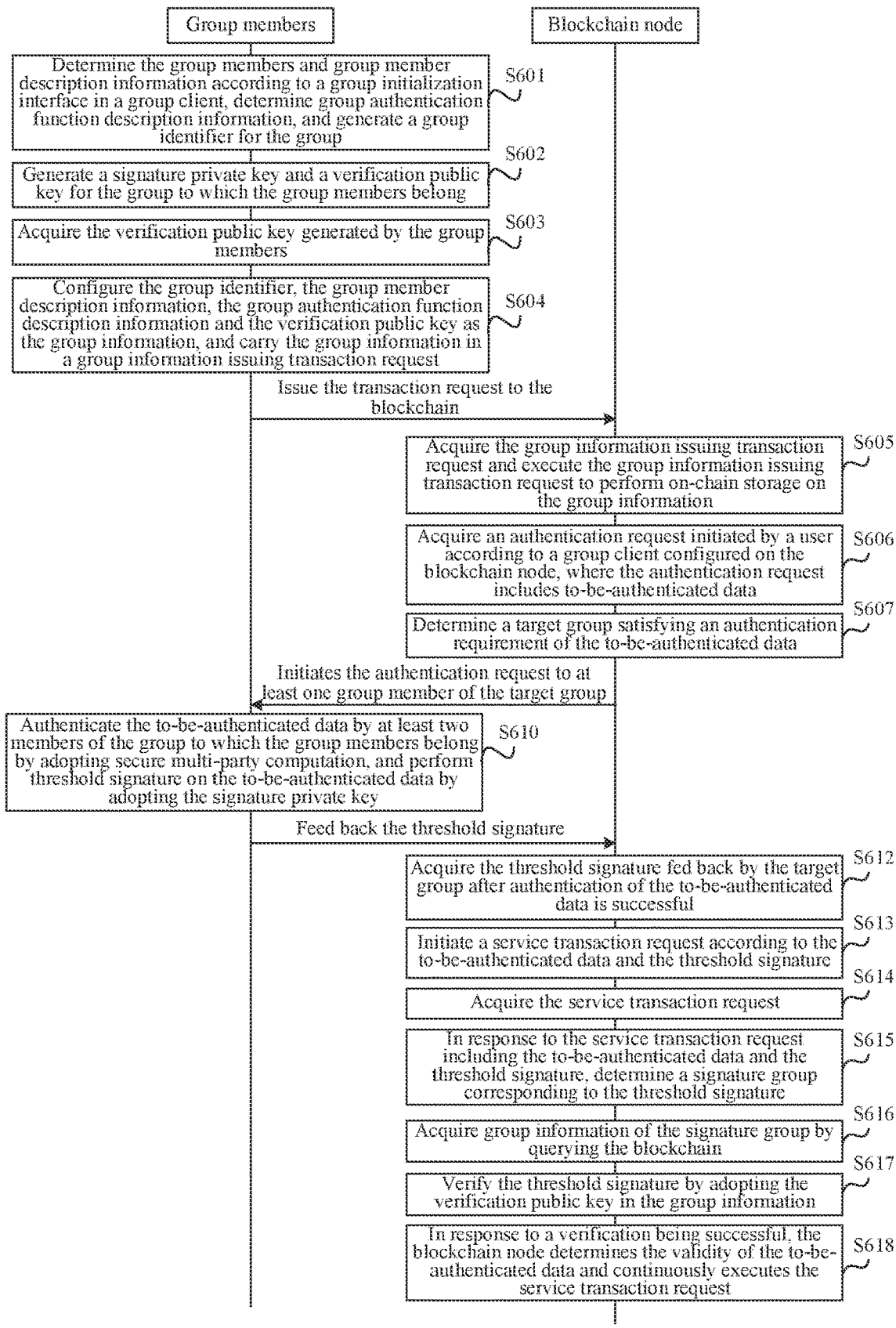
FIG. 6A is a diagram showing signaling of a group service implementation method based on a blockchain according to an embodiment of the present disclosure.
Figure 6B:
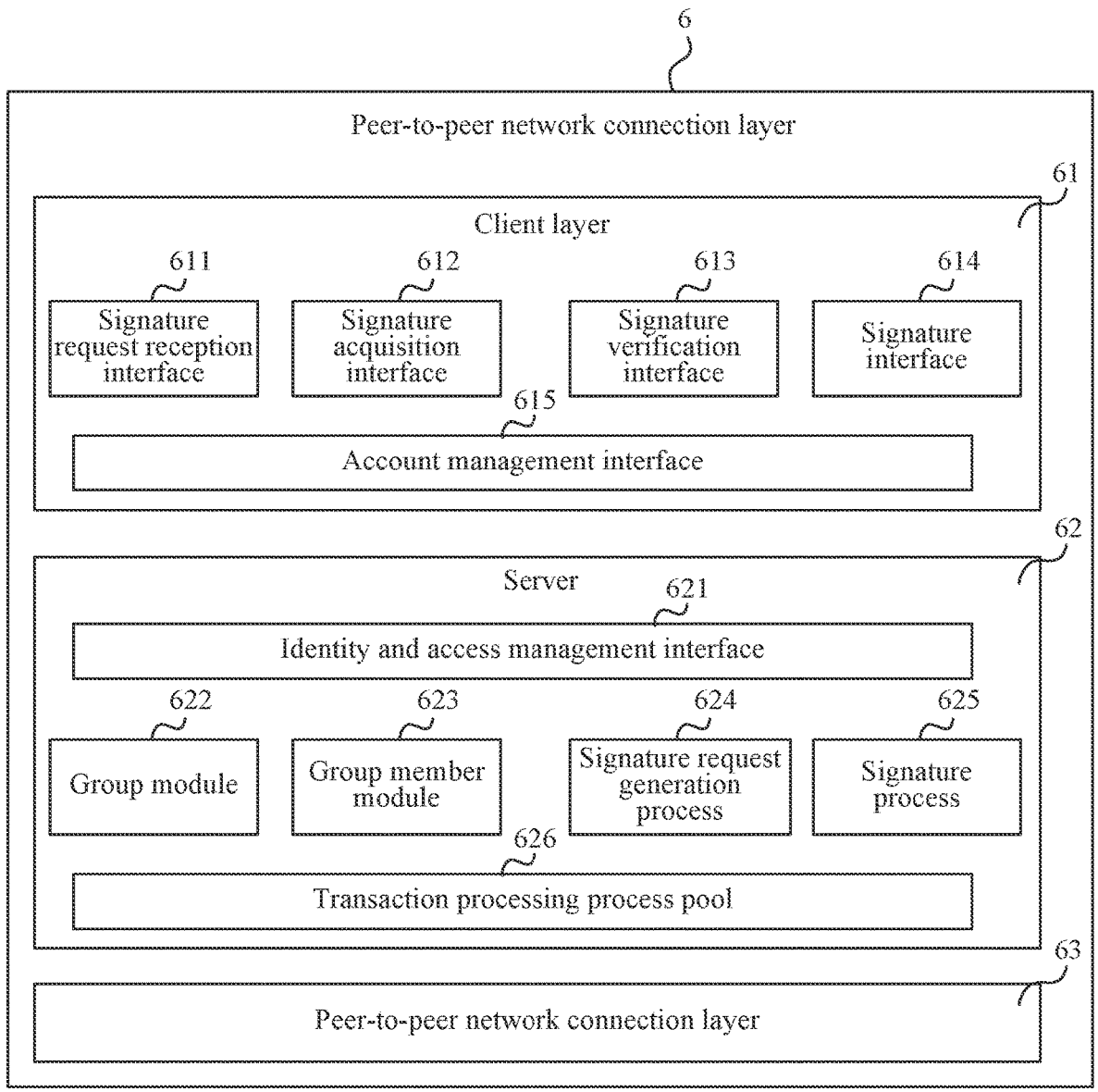
FIG. 6B is a diagram showing a node architecture according to an embodiment of the present disclosure.

FIG. 6A is a diagram showing signaling of a group service implementation method based on a blockchain according to an embodiment of the present disclosure; FIG. 6B is a diagram showing a node architecture according to an embodiment of the present disclosure. On the basis of the above various embodiments, this embodiment provides a detailed introduction to how to interactively implement the group service implementation method based on a blockchain of the embodiment when the blockchain node and the member nodes of the group are deployed according to the node architecture shown in FIG. 6B.

The schematic diagram of the node architecture shown in FIG. 6B is first briefly introduced. For a node 6, the top layer is a client layer 61, the middle layer is a server layer 62, and the bottom layer is a peer-to-peer (P2P) network connection layer 63.

The client layer 61 includes following interfaces: a signature request reception interface (e.g. Request Tss Sign) 611, a signature acquisition interface (e.g. Get Tss Sign) 612, a signature verification interface (e.g. Verify Tss Sign) 613, a signature interface (e.g. Sign) 614 and an account management interface (e.g. Account) 615. These interfaces can be called to interact with the server to execute corresponding functions. The server layer 62 includes: an identity and access management interface (e.g. IAM) 621, a group module (e.g. Group) 622, a group member module (e.g. GroupMember) 623, a signature request generation process (e.g. Tss Sign Request) 624, a signature process (e.g. Tss Sign) 625 and a transaction processing process pool (e.g. TssCore and TaskPool) 626.

Optionally, in the embodiment of the present disclosure, the group members and the blockchain node are all deployed according to the node architecture shown in FIG. 6B. As shown in FIGS. 6A to 6B, the method includes steps described below.

In step S601, the group members determine the group members and group member description information according to a group initialization interface in a group client, determine group authentication function description information, and generate a group identifier for the group.

Exemplarily, the group members may call the group module 622 of the server layer according to the account management interface (that is, the initialization interface) 615 of the client layer 61 of the group shown in FIG. 6B, so as to determine the group members and the group authentication function description information, generate the group identifier for the group, and call the group member module 623 and determine and record the group member description information. Specifically, user 1 and user 2 negotiate offline to construct a group for personnel qualification authentication. User 1 may be an organization member and input the group members (user 1 and user 2), the authentication function (personnel qualification authentication) of the group, the name (the first qualification authentication group) of the group and the like into the account management interface 615 of the client layer 61 of the group and then click OK. The account management interface 615 can call the group module 622 and the group member module 623 of the server layer 62 to determine the group members and the group member description information, determine the group authentication function description information, and generate the group identifier for the group.

In step S602, the group members generate a signature private key and a verification public key for the group to which the group members belong.

Exemplarily, the group module 622 of the server layer 62 of the group members may generate the signature private key and the verification public key for the group to which the group members belong.

In step S603, the group members acquire the verification public key generated by the group members.

In step S604, the group members configure the group identifier, the group member description information, the group authentication function description information and the verification public key as the group information, carry the group information in a group information issuing transaction request, and issue the group information issuing transaction request to the blockchain.

Exemplarily, the transaction processing pool 626 of the group members may configure the group identifier, the group member description information, the group authentication function description information and the verification public key as the group information, generate a group information issuing transaction request including the group information, and issue the group information to the blockchain.

In step S605, the blockchain node acquires the group information issuing transaction request and executes the group information issuing transaction request to perform on-chain storage on the group information.

Exemplarily, after acquiring the group information issuing transaction request, the blockchain node may execute the group information issuing transaction request through the transaction processing process pool 626 of the server layer 62, so as to perform on-chain storage on the group information.

In step S606, the blockchain node acquires an authentication request initiated by a user according to a group client configured on the blockchain node, where the authentication request includes to-be-authenticated data.

Exemplarily, the blockchain node may acquires to-be-signatured data input by a user into the signature acquisition interface 612 according to the signature acquisition interface 612 of the client layer 61, and generate an authentication request including the to-be-authenticated data.

In step S607, the blockchain node determines a target group satisfying an authentication requirement of the to-be-authenticated data.

Exemplarily, the signature acquisition interface 612 of the blockchain node may call the transaction processing process pool 626 of the server layer 62 to determine a target group satisfying an authentication requirement of the to-be-authenticated data.

In step S608, the blockchain node initiates the authentication request to at least one group member of the target group.

Exemplarily, after determining the target group, the transaction processing process pool 626 of the blockchain node may call the signature request generation process 624 to initiate the authentication request, and transmit the authentication request to at least one group member of the target group through the peer-to-peer network connection layer 63.

In step S609, the group members acquire the authentication request for authenticating the to-be-authenticated data.

In step S610, the to-be-authenticated data is authenticated by at least two members among the group members of the group to which the group members belong by adopting secure multi-party computation, and threshold signature is performed on the to-be-authenticated data by adopting the signature private key.

Exemplarily, the signature interface 614 of the client layer 61 of the group members may receive the authentication result and signature private key input by a local member, call the signature process 625 of the server layer 62 to authenticate the to-be-authenticated data by adopting secure multi-party computation, and perform the operation of threshold signature on the to-be-authenticated data by adopting the signature private key.

In step S611, the group members feed back the threshold signature to the blockchain node initiating the authentication request.

Exemplarily, the signature acquisition interface 612 of the group members accesses the signature request generation process 624 to acquire the threshold signature generated by the signature request generation process 624, and calls the peer-to-peer network connection layer 63 to transmit the generated threshold signature to the blockchain node for authenticating the quest.

In step S612, the blockchain node acquires the threshold signature fed back by the target group after authentication of the to-be-authenticated data is successful.

In step S613, the blockchain node initiates a service transaction request according to the to-be-authenticated data and the threshold signature.

Exemplarily, after acquiring the threshold signature fed back by the target group through the peer-to-peer network connection layer 63, the blockchain node initiates a service transaction request based on the transaction processing process pool 626 and according to the to-be-authenticated data and the threshold signature.

In step S614, the blockchain node acquires the service transaction request.

In step S615, in response to the service transaction request including the to-be-authenticated data and the threshold signature, the blockchain node determines a signature group corresponding to the threshold signature.

In step S616, the blockchain node acquires group information of the signature group by querying the blockchain.

Exemplarily, if the service transaction request acquired by the blockchain node includes the to-be-authenticated data and the threshold signature, the blockchain node determines a signature group corresponding to the threshold signature through the transaction processing process pool 626 of the server client and acquires group information of the signature group by querying the blockchain.

In step S617, the blockchain node verifies the threshold signature by adopting the verification public key in the group information.

In step S618, in response to a verification being successful, the blockchain node determines the validity of the to-be-authenticated data and continuously executes the service transaction request.

Exemplarily, the blockchain node may input the verification public key and the threshold signature into the signature verification interface 613, the signature verification interface 613 may verify the threshold signature; if the verification is successful, the signature verification interface 613 determines the validity of the to-be-authenticated data and then call the transaction processing process pool 626 to continuously execute the service transaction request.

In the solution of the embodiment of the present disclosure, the group constructed with at least two members is provided, and a preferable solution of the group service based on a blockchain is implemented according to the coordination between the group and the blockchain node. In the process of processing the group service, the blockchain node does not need to interact with each member of the group, so that the efficiency of executing the service transaction request is improved, and the requirements of auditing authorization services are well matched.

Figure 7:
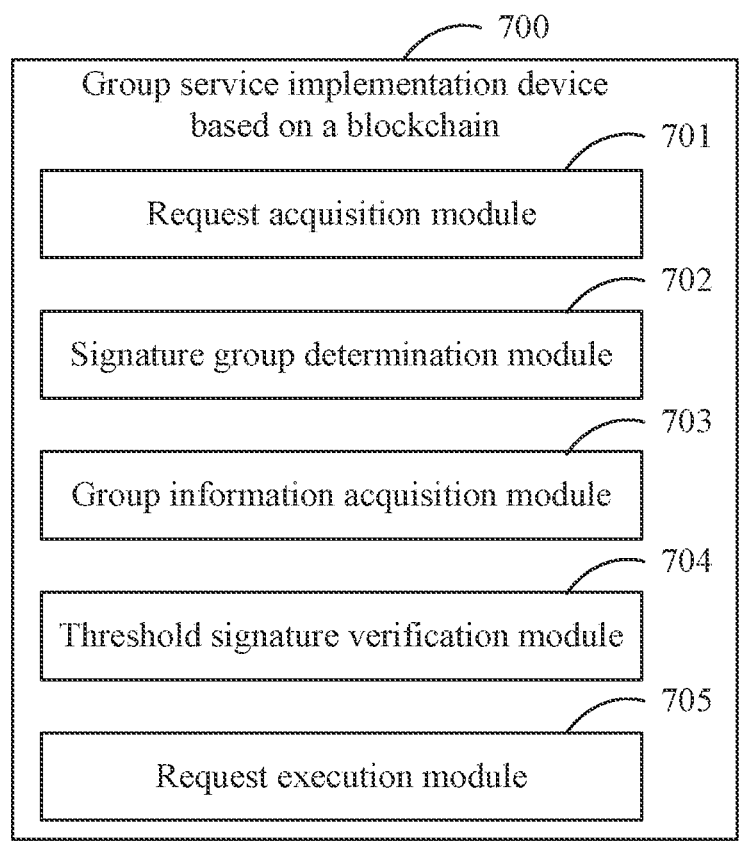
FIG. 7 is a structural diagram of a group service implementation device based on a blockchain according to an embodiment of the present disclosure.

FIG. 7 is a structural diagram of a group service implementation device based on a blockchain according to an embodiment of the present disclosure. The embodiment is applicable to the situation where a blockchain node executes services needing multi-party coordination to be implemented, such as auditing authorization services. The device may be configured on a blockchain node, specifically configured in the electronic equipment where the blockchain node is located, and the device may implement the group service implementation method based on a blockchain of embodiments of the present disclosure. The device 700 specifically includes a request acquisition module 701, a signature group determination module 702, a group information acquisition module 703, a threshold signature verification module 704 and a request execution module 705.

The request acquisition module 701 is configured to acquire a service transaction request.

The signature group determination module 702 is configured to, in response to the service transaction request including to-be-authenticated data and a threshold signature, determine a signature group corresponding to the threshold signature.

The group information acquisition module 703 is configured to acquire group information of the signature group by querying the blockchain, where the signature group includes at least two members, the at least two members of the signature group are used for authenticating the to-be-authenticated data by adopting secure multi-party computation, and generating the threshold signature for the to-be-authenticated data by adopting a signature private key, and the group information includes at least a verification public key of the threshold signature.

The threshold signature verification module 704 is configured to verify the threshold signature by adopting the verification public key in the group information.

The request execution module 705 is configured to, in response to a verification being successful, determine the validity of the to-be-authenticated data, and continuously execute the service transaction request.

In the solution of the embodiment of the present disclosure, after the service transaction request including the to-be-authenticated data and the threshold signature is acquired, the signature group of the threshold signature is first determined, and the verification public key of the signature group is acquired to verify the threshold signature. If the verification is successful, the subsequent operations of the service transaction request can be continued. In the solution of the embodiment of the present disclosure, outside the blockchain network, an independent system that provides a certain function authentication service is constructed in units of groups to provide a threshold signature function for a blockchain node. On-chain storage is performed on the group information of the group. For auditing authorization services that require multi-party coordination to be implemented, in the process of executing the service transaction request, the blockchain node only needs to acquire the verification public key of the signature group from the blockchain network and then can implements the verification on the threshold signature of the to-be-authenticated data and does not need to interact with each data authentication party (that is, each member in the group). Therefore, the efficiency of executing the service transaction request is improved, and the requirements of auditing authorization services are well matched.

Further, the request acquisition module 701 is further configured to execute the step described below.

The request acquisition module 701 is further configured to acquire a group information issuing transaction request, and execute the group information issuing transaction request to perform on-chain storage on the group information.

Further, the group information includes: a group identifier, group member description information, group authentication function description information and the verification public key.

Further, the device further includes an information query display module.

The information query display module is configured to, in response to a group information display request being acquired, acquire at least one piece of group information by querying the blockchain, and display the at least one piece of group information to a user.

Further, the request acquisition module 701 is further configured to acquire, according to a group client configured on the blockchain node, an authentication request initiated by a user, where the authentication request includes the to-be-authenticated data.

The device further includes a target group determination module, a request sending module, a threshold signature acquisition module and a request initiation module.

The target group determination module is configured to determine a target group satisfying an authentication requirement of the to-be-authenticated data.

The request sending module is configured to initiate the authentication request to at least one group member of the target group.

The threshold signature acquisition module is configured to acquire a threshold signature fed back by the target group after authentication of the to-be-authenticated data is successful.

The request initiation module is configured to initiate, according to the to-be-authenticated data and the threshold signature, the service transaction request.

Further, the target group determination module is specifically configured to execute steps described below.

The target group determination module is specifically configured to acquire the target group specified by a user in the authentication request and satisfying the authentication requirement.

Alternatively, target group determination module is specifically configured to query issued group information from the blockchain, and determine, according to authentication function description information of the group information, at least one group matched with the authentication requirement as the target group.

Figure 8:
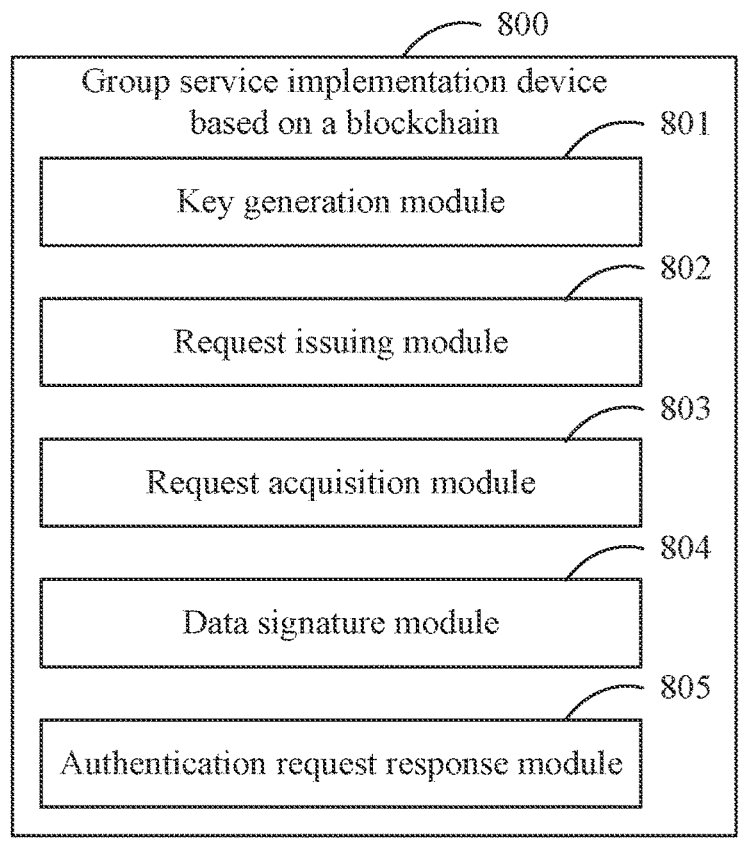
FIG. 8 is a structural diagram of another group service implementation device based on a blockchain according to an embodiment of the present disclosure.

FIG. 8 is a structural diagram of another group service implementation device based on a blockchain according to an embodiment of the present disclosure. The embodiment is applicable to the situation where group members execute services needing multi-party coordination to be implemented, such as auditing authorization services. The device may be configured in the equipment where the group members are located, and the device may implement the group service implementation method based on a blockchain of embodiments of the present disclosure. The device 800 specifically includes a key generation module 801, a request issuing module 802, a request acquisition module 803, a data signature module 804 and an authentication request response module 805.

The key generation module 801 is configured to generate a signature private key and a verification public key for a group to which the group members belong.

The request issuing module 802 is configured to configure the verification public key as group information, carry the group information in a group information issuing transaction request, and issue the group information issuing transaction request to the blockchain for storage.

The request acquisition module 803 is configured to acquire an authentication request for authenticating to-be-authenticated data.

The data signature module 804 is configured to authenticate the to-be-authenticated data by at least two members among the group members of the group to which the group members belong by adopting secure multi-party computation, and perform threshold signature on the to-be-authenticated data by adopting the signature private key.

The authentication request response module 805 is configured to respond to the authentication request according to the threshold signature, where the threshold signature is used for being carried in a service transaction request initiated on the blockchain to enable a blockchain node to verify the threshold signature according to the verification public key stored in the blockchain.

In the technical solution of the embodiment of the present disclosure, the group members generate the signature private key and the verification public key for the group to which the group members belong, and carry the verification public key in the group information issuing transaction request for on-chain storage. When the authentication request for authenticating the to-be-authenticated data by the user is acquired, at least two members of the group to which the group members belong adopt secure multi-party computation to authenticate the to-be-authenticated data, adopt the signature private key to perform threshold signature on the to-be-authenticated data, and respond to the authentication request according to the threshold signature. In the solution of the embodiment of the present disclosure, outside the blockchain network, an independent system that provides a certain function authentication service is constructed in units of groups to provide a threshold signature service for a blockchain node. On-chain storage is performed on the group information of the group, so that the openness and security of the group information is ensured, and at the same time, it is convenient for the blockchain node to quickly find group information of issued groups when executing the service transaction request related to the threshold signature. Therefore, the efficiency of executing the service transaction request is improved, and the requirements of auditing authorization services are well matched.

Further, the group information includes: a group identifier, group member description information, group authentication function description information and the verification public key.

Further, the device further includes a group information determination module and a public key acquisition module.

The group information determination module is configured to determine, according to a group initialization interface in a group client, group members and the group member description information, the group authentication function description information, and generate the group identifier for the group.

The public key acquisition module is configured to acquire the verification public key generated by the group members.

Further, the group members are clients deployed at the blockchain node or clients independent of the blockchain node.

Further, the group members belong to one or more groups, and each group has the same or different authentication functions.

Further, the authentication function includes at least one of: personnel qualification authentication, unit qualification authentication or data validity authentication.

Further, the request acquisition module 803 is specifically configured to execute steps described below.

The request acquisition module 803 is specifically configured to acquire an authentication transaction request initiated by the blockchain node on the chain and for authenticating the to-be-authenticated data.

Alternatively, the request acquisition module 803 is specifically configured to acquire an authentication request of the blockchain node during peer-to-peer transmission and for authenticating the to-be-authenticated data.

Further, the data signature module 804 is specifically configured to execute the step described below.

The data signature module 804 is specifically configured to authenticate, by the at least two members among the group members of the group to which the group members belong and according to control of an organization member of the group to which the group members belong, the to-be-authenticated data by adopting the secure multi-party computation, and perform the threshold signature on the to-be-authenticated data by adopting the signature private key.

Correspondingly, the authentication request response module 805 is specifically configured to execute the step described below.

The authentication request response module 805 is specifically configured to feed back the threshold signature to an initiator of the authentication request through the organization member.

Further, the data signature module 804 is specifically configured to execute steps described below.

The data signature module 804 is specifically configured to, in response to a local member being the organization member, inform the at least two members among the group members of the group to which the group members belong of authenticating the to-be-authenticated data by adopting the secure multi-party computation, and perform the threshold signature on the to-be-authenticated data by adopting the signature private key.

The data signature module 804 is specifically configured to receive a threshold signature fed back by the group member, and count a number of group members among the group members actually participating in the threshold signature.

The data signature module 804 is specifically configured to, in response to the number reaching a minimum threshold value, inform other group members of stopping executing authentication.

According to embodiments of the present disclosure, the present disclosure further provides an electronic equipment, a readable storage medium and a computer program product.

Figure 9:
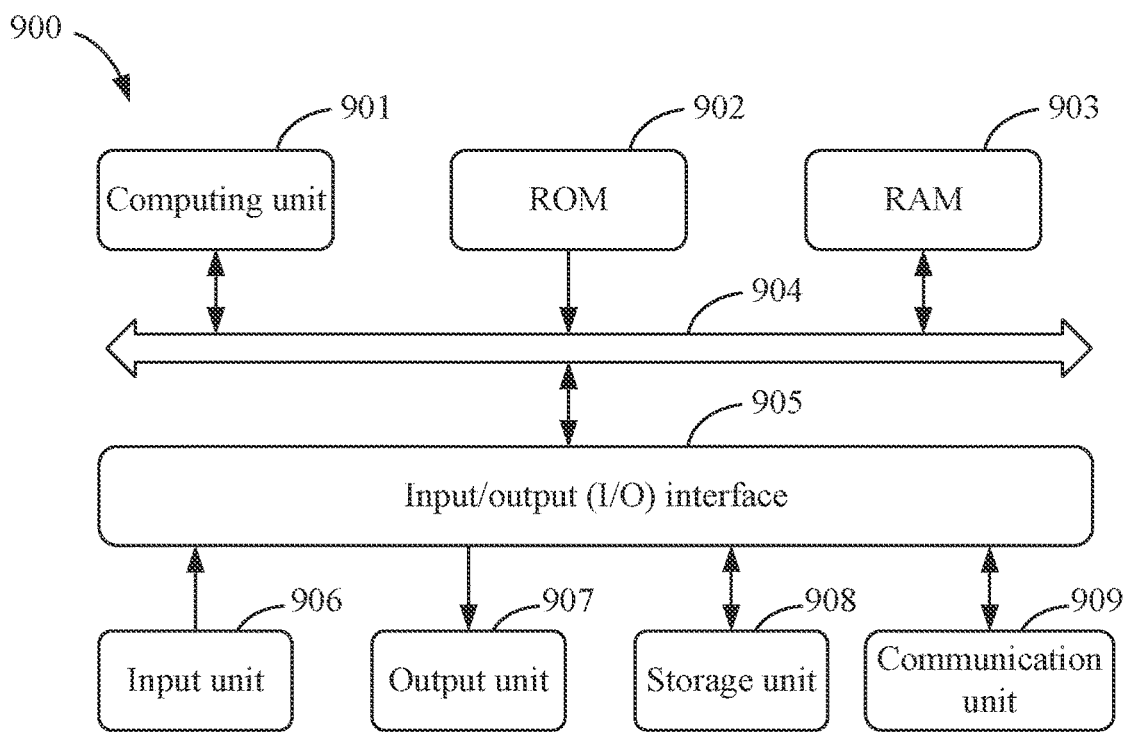
FIG. 9 is a block diagram of an electronic equipment for implementing an group service implementation method based on a blockchain according to an embodiment of the present disclosure.

FIG. 9 is a block diagram showing an exemplary electronic device 900 that may be used for implementing embodiments of the present application. Electronic equipments are intended to represent various forms of digital computers, for example, laptop computers, desktop computers, worktables, personal digital assistants, servers, blade servers, mainframe computers and other applicable computers. Electronic equipments may also represent various forms of mobile devices, for example, personal digital assistants, cellphones, smartphones, wearable devices and other similar computing devices. Herein the shown components, the connections and relationships between these components, and the functions of these components are illustrative only and are not intended to limit the implementation of the present disclosure as described and/or claimed herein.

As shown in FIG. 9, the equipment 900 includes a computing unit 901. The computing unit 901 may execute various appropriate actions and processing according to a computer program stored in a read-only memory (ROM) 902 or a computer program loaded into a random-access memory (RAM) 903 from a storage unit 908. The RAM 903 may also store various programs and data required for operations of the equipment 900. The computing unit 91, the ROM 902 and the RAM 903 are connected to each other by a bus 904. An input/output (I/O) interface 905 is also connected to the bus 904.

Multiple components in the equipment 900 are connected to the I/O interface 905. The multiple components include an input unit 906 such as a keyboard or a mouse; an output unit 907 such as various types of displays or speakers; a storage unit 908 such as a magnetic disk or an optical disk; and a communication unit 909 such as a network card, a modem or a wireless communication transceiver. The communication unit 909 allows the equipment 900 to exchange information/data with other equipments over a computer network such as the Internet and/or over various telecommunication networks.

The computing unit 901 may be a general-purpose and/or special-purpose processing component having processing and computing capabilities. Examples of the computing unit 901 include, but are not limited to, a central processing unit (CPU), a graphics processing unit (GPU), a special-purpose artificial intelligence (AI) computing chip, a computing unit executing machine learning model algorithms, a digital signal processor (DSP), and any appropriate processor, controller and microcontroller. The computing unit 901 executes various methods and processing described above, such as the group service implementation method based on a blockchain. For example, in some embodiments, the group service implementation method based on a blockchain may be implemented as a computer software program tangibly contained in a machine-readable medium such as the storage unit 908. In some embodiments, part or all of computer programs may be loaded and/or installed on the equipment 900 via the ROM 902 and/or the communication unit 909. When the computer program is loaded onto the RAM 903 and executed by the computing unit 901, one or more steps of the preceding group service implementation method based on a blockchain may be executed. Alternatively, in other embodiments, the computing unit 901 may be configured, in any other suitable manner (for example, by means of firmware), to execute the group service implementation method based on a blockchain.

The preceding various embodiments of systems and techniques may be implemented in digital electronic circuitry, integrated circuitry, a field-programmable gate array (FPGA), an disclosure-specific integrated circuit (ASIC), an disclosure-specific standard product (ASSP), a system on a chip (SoC), a complex programmable logic device (CPLD), computer hardware, firmware, software and/or any combination thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input device and at least one output device and transmitting the data and instructions to the memory system, the at least one input device and the at least one output device.

Program codes for implementation of the method of the present disclosure may be written in any combination of one or more programming languages. These program codes may be provided for the processor or controller of a general-purpose computer, a special-purpose computer or another programmable data processing device to enable functions/operations specified in a flowchart and/or a block diagram to be implemented when the program codes are executed by the processor or controller. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that contains or stores a program available for an instruction execution system, device or equipment or a program used in conjunction with an instruction execution system, device or equipment. The machine-readable medium may be a machine-readable signal medium or a machine-readable storage medium. The machine-readable medium may include, but is not limited to, an electronic, magnetic, optical, electromagnetic, infrared or semiconductor system, device or equipment, or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage equipment, a magnetic storage equipment, or any appropriate combination thereof.

In order that interaction with a user is provided, the systems and techniques described herein may be implemented on a computer. The computer has a display device (for example, a cathode-ray tube (CRT) or liquid-crystal display (LCD) monitor) for displaying information to the user; and a keyboard and a pointing device (for example, a mouse or a trackball) through which the user can provide input to the computer. Other types of devices may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. The components of the system may be interconnected by any form or medium of digital data communication (for example, a communication network). Examples of the communication network include a local area network (LAN), a wide area network (WAN), a blockchain network and the Internet.

The computing system may include clients and servers. A client and a server are generally remote from each other and typically interact through a communication network. The relationship between the client and the server arises by virtue of computer programs running on the respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. A group service implementation method based on a blockchain, executed by a blockchain node, characterized by comprising:

acquiring a service transaction request;
in response to the service transaction request comprising to-be-authenticated data and a threshold signature, determining a group corresponding to the threshold signature, wherein the threshold signature is generated for the to-be authenticated data by at least two members of the group adopting a signature private key after the to-be-authenticated data is authenticated by the at least two members adopting secure multi-party computation;
acquiring group information of the group by querying the blockchain, wherein the group information comprises at least a verification public key of the threshold signature;
verifying the threshold signature by adopting the verification public key in the group information;
in response to a verification being successful, determining a validity of the to-be-authenticated data, and continuously executing the service transaction request; and
before acquiring the service transaction request, the method further comprising:
acquiring, according to a group client configured on the blockchain node, an authentication request initiated by a user, wherein the authentication request comprises the to-be-authenticated data;
determining a target group satisfying an authentication requirement of the to-be-authenticated data;
initiating the authentication request to at least one group member of the target group;
acquiring a threshold signature fed back by the target group after verification of the to-be-authenticated data is successful; and
initiating, according to the to-be-authenticated data and the threshold signature, the service transaction request.

2. The method according to claim 1, further comprising:
acquiring a group information issuing transaction request, and executing the group information issuing transaction request to perform on-chain storage on the group information.

3. The method according to claim 1, wherein the group information comprises: a group identifier, group member description information, group authentication function description information and the verification public key.

4. The method according to claim 3, further comprising:
in response to a group information display request being acquired, acquiring at least one piece of group information by querying the blockchain, and displaying the at least one piece of group information to a user.

5. The method according to claim 1, wherein the determining the target group satisfying the authentication requirement of the to-be-authenticated data comprises:
acquiring the target group specified by a user in the authentication request and satisfying the authentication requirement; or querying issued group information from the blockchain, and
determining, according to authentication function description information of the group information, at least one group matched with the authentication requirement as the target group.

6. An electronic equipment, comprising:
at least one processor; and
a memory communicatively connected to the at least one processor,
wherein the memory stores instructions executable by the at least one processor, and the instructions are executed by the at least one processor to cause the at least one processor to execute the group service implementation method based on a blockchain of claim 1.

7. A non-transitory computer-readable storage medium, storing computer instructions for causing a computer to execute the group service implementation method based on a blockchain of claim 1.

8. A group service implementation method based on a blockchain, comprising:
generating, by one member of group members, a signature private key and a verification public key for a group to which the group members belong;
configuring, by the one member of the group members, the verification public key as group information, carrying the group information in a group information issuing transaction request, and issuing the group information issuing transaction request to the blockchain for storage;
acquiring, by the one member of the group members, an authentication request for authenticating to-be-authenticated data;
informing, by the one member of the group members, at least two members among the group members of the group to which the group members belong of authenticating the to-be-authenticated data by adopting secure multi-party computation and performing threshold signature on the to-be authenticated data by adopting the signature private key, and obtaining, by the one member of the group members, the threshold signature from the at least two members, wherein the threshold signature is generated for the to-be-authenticated data by the at least two members adopting the signature private key after the to-be-authenticated data is authenticated by the at least two members adopting the secure multi-party computation; and
responding, by the one member of the group members, the authentication request according to the threshold signature, wherein the threshold signature is used for being carried in a service transaction request initiated on the blockchain to enable a blockchain node to verify the threshold signature according to the verification public key stored in the blockchain; and
the method further comprising:
acquiring, by the blockchain node, according to a group client configured on the blockchain node, an authentication request initiated by a user, wherein the authentication request comprises the to-be-authenticated data;
determining, by the blockchain node, a target group satisfying an authentication requirement of the to-be-authenticated data, wherein the target group comprises the group to which the group members belong to;
initiating, by the blockchain node, the authentication request to at least one group member of the target group;
acquiring, by the blockchain node, the threshold signature fed back by the target group after verification of the to-be-authenticated data is successful; and
initiating, by the blockchain node, according to the to-be-authenticated data and the threshold signature, the service transaction request.

9. The method according to claim 8, wherein the group information comprises: a group identifier, group member description information, group authentication function description information and the verification public key.

10. The method according to claim 9, further comprising:
determining, by the one member of the group members, according to a group initialization interface in a group client, the group members and the group member description information, determining the group authentication function description information, and generating the group identifier for the group; and acquiring, by the one member of the group members, the verification public key generated by the one member of the group members.

11. The method according to claim 8, wherein the group members are clients deployed at the blockchain node or clients independent of the blockchain node.

12. The method according to claim 8, wherein the group members belong to one or more groups, and each of the one or more groups has a same or different authentication functions.

13. The method according to claim 12, wherein the authentication function comprises at least one of: personnel qualification authentication, unit qualification authentication or data validity authentication.

14. The method according to claim 8, wherein the acquiring, by the one member of the group members, the authentication request for authenticating the to-be-authenticated data comprises:

acquiring, by the one member of the group members, an authentication request initiated by the blockchain node on the chain and for authenticating the to-be-authenticated data; or acquiring, by the one member of the group members, an authentication request of the blockchain node during peer-to-peer transmission and for authenticating the to-be-authenticated data.

15. The method according to claim 8, wherein the informing, by the one member of the group members, the at least two members among the group members of the group to which the group members belong of authenticating the to-be-authenticated data by adopting the secure multi-party computation and performing the threshold signature on the to-be-authenticated data by adopting the signature private key, and obtaining, by the one member of the group members, the threshold signature from the at least two members comprises:

informing, by the one member of the group members, the at least two members among the group members of the group to which the group members belong of authenticating the to-be-authenticated data by adopting the secure multi-party computation and performing the threshold signature on the to-be-authenticated data by adopting the signature private key;

receiving, by the one member of the group members, the threshold signature fed back by the at least two member of the group members;

counting, by the one member of the group members, a number of group members among the group members actually participating in the threshold signature; and in response to the number reaching a minimum threshold value, informing, by the one member of the group members, other group members of stopping executing authentication; and wherein the responding, by the one member of the group members, the authentication request according to the threshold signature comprises:

feeding back, by the one member of the group members, the threshold signature to an initiator of the authentication request.

16. The method according to claim 15, wherein the authenticating, by the at least two members among the group members of the group to which the group members belong and according to the control of the organization member of the group to which the group members belong, the to-be-authenticated data by adopting the secure multi-party computation, and performing the threshold signature on the to-be-authenticated data by adopting the signature private key comprises:

in response to a local member being the organization member, informing the at least two members among the group members of the group to which the group members belong of authenticating the to-be-authenticated data by adopting the secure multi-party computation, and performing the threshold signature on the to-be-authenticated data by adopting the signature private key;

receiving a threshold signature fed back by the group member, and counting a number of group members among the group members actually participating in the threshold signature; and in response to the number reaching a minimum threshold value, informing other group members of stopping executing authentication.

17. An electronic equipment, comprising:

at least one processor; and a memory communicatively connected to the at least one processor, wherein the memory stores instructions executable by the at least one processor, and the instructions are executed by the at least one processor to cause the at least one processor to execute the group service implementation method based on a blockchain of claim 8.

18. A non-transitory computer-readable storage medium, storing computer instructions for causing a computer to execute the group service implementation method based on a blockchain of claim 8.

* * * * *